United States Patent [19]

Hiroki

[11] Patent Number: 5,896,365
[45] Date of Patent: *Apr. 20, 1999

[54] OPTICAL INFORMATION RECORDING MEDIUM CAPABLE OF RECORDING IN LANDS AND GROOVES WITHOUT A TRACK-JUMPING OPERATION; OPTICAL INFORMATION RECORDING/ REPRODUCING APPARATUS USING, AND MASTER DISK EXPOSURE APPARATUS FOR PRODUCING THE SAME

[75] Inventor: Tomoyuki Hiroki, Zama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/637,211

[22] Filed: Apr. 24, 1996

[30] Foreign Application Priority Data

| Apr. 28, 1995 | [JP] | Japan | 7-106463 |
| Jul. 7, 1995 | [JP] | Japan | 7-172109 |
| Jul. 18, 1995 | [JP] | Japan | 7-181479 |

[51] Int. Cl.$^6$ ............................................. G11B 7/00
[52] U.S. Cl. ......................... 369/275.4; 369/58; 369/44.28
[58] Field of Search ....................... 369/275.4, 275.1, 369/58, 54, 47, 44.28

[56] References Cited

U.S. PATENT DOCUMENTS

| 4,949,331 | 8/1990 | Maeda et al. | 369/275.3 |
| 5,084,860 | 1/1992 | Maeda et al. | 369/275.3 |
| 5,383,176 | 1/1995 | Inui et al. | 369/275.4 |
| 5,422,874 | 6/1995 | Birukawa et al. | 369/275.2 |
| 5,433,874 | 7/1995 | Song et al. | 252/51.005 R |
| 5,477,524 | 12/1995 | Deguchi et al. | |

FOREIGN PATENT DOCUMENTS

| 0 099 576 | 2/1984 | European Pat. Off. . |
| 0 446 967 | 9/1991 | European Pat. Off. . |
| 0 559 449 | 9/1993 | European Pat. Off. . |
| 0 637 018 | 2/1995 | European Pat. Off. . |
| 3620301 | 1/1987 | Germany . |
| 63-66734 | 3/1988 | Japan . |
| 1-302538 | 12/1989 | Japan . |
| 3-93058 | 4/1991 | Japan . |
| 4-255946 | 9/1992 | Japan . |
| 6-89473 | 3/1994 | Japan . |
| 6-124500 | 5/1994 | Japan . |
| 8-96417 | 4/1996 | Japan . |

Primary Examiner—Muhammad N. Edun
Attorney, Agent, or Firm—Fitzpatrick, Cella, Harper & Scinto

[57] ABSTRACT

An optical information recording medium is provided which enables recording of information alternately in a land and a groove of a track, without requiring a track jumping operation. The medium has a plurality of tracks each including a land and a groove, and a mirror section which divides each track in the circumferential direction of the disk. The land and the groove are consecutively formed across the mirror section, so as to form the track. An optical information recording/reproducing apparatus using the medium and a master disk exposure apparatus for producing the medium are also disclosed.

18 Claims, 18 Drawing Sheets

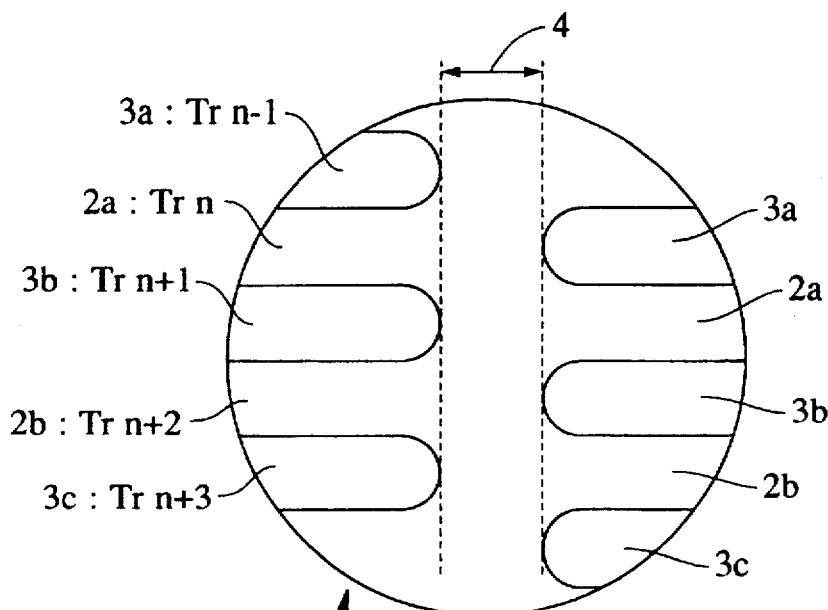
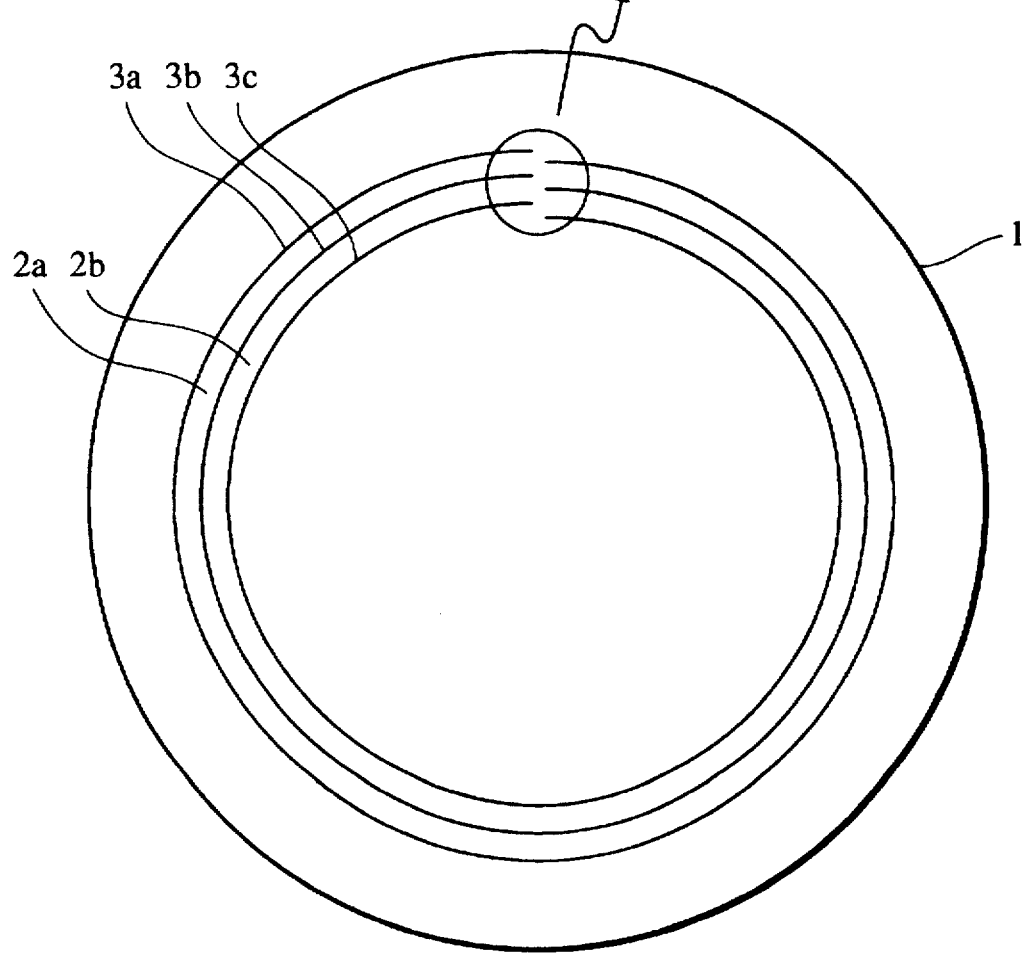

FIG. 6(a)
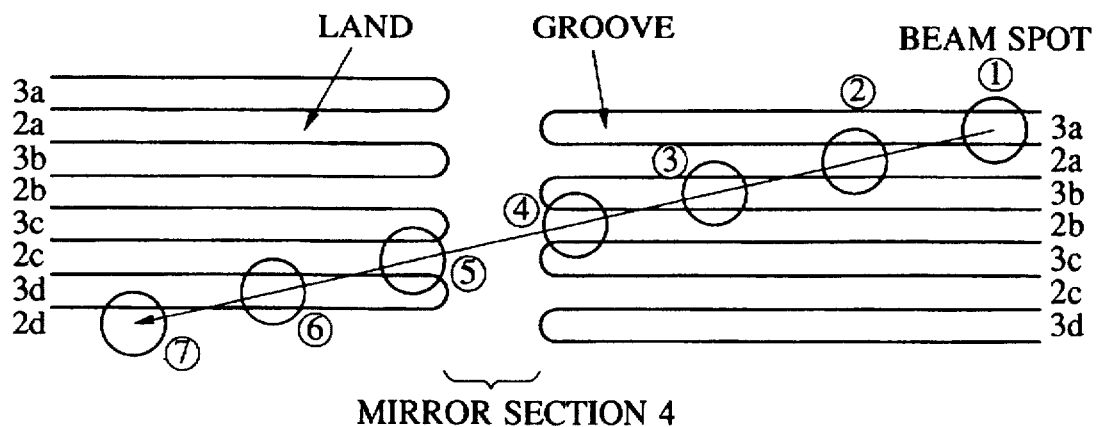
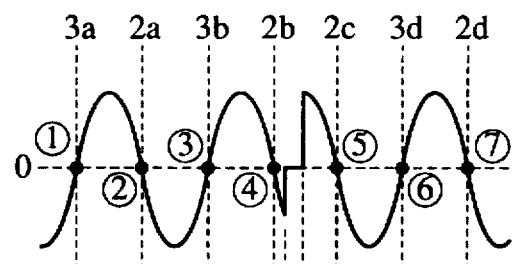
FIG. 6(b)(1) TRACKING ERROR SIGNAL (a)
FIG. 6(b)(2) DC LEVEL SIGNAL (c)
FIG. 6(b)(3) SUM SIGNAL (b)
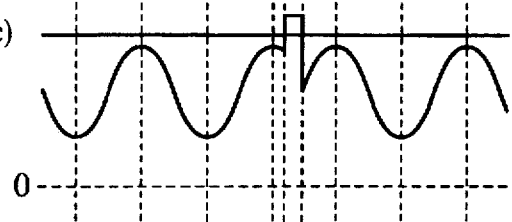
FIG. 6(b)(4) BINARY SIGNAL (d)
FIG. 6(b)(5) POLARITY CHANGE-OVER SIGNAL (e)
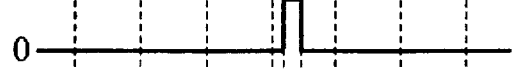
FIG. 6(b)(6) TRACKING ERROR SIGNAL (f)

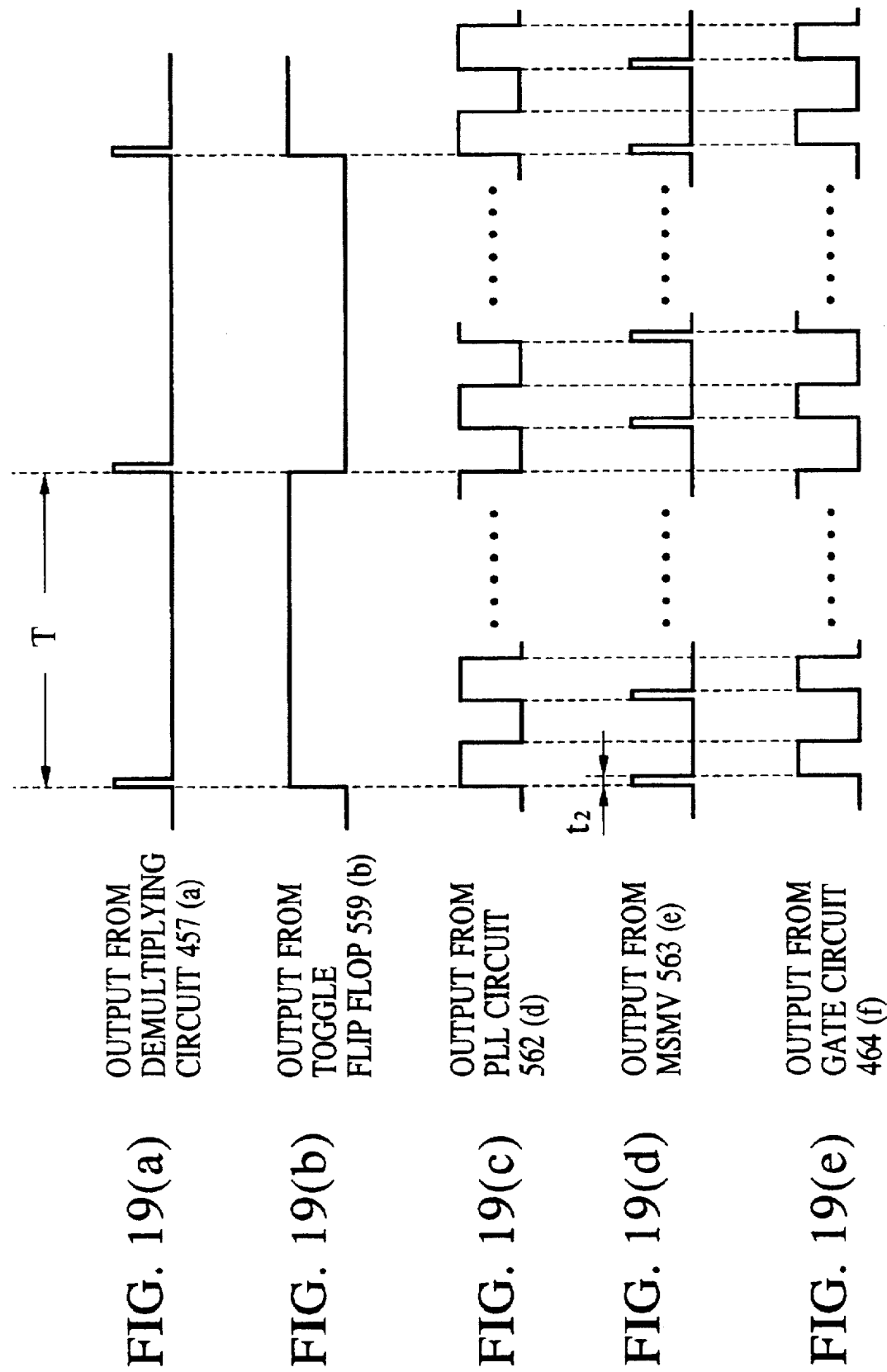

OPTICAL INFORMATION RECORDING MEDIUM CAPABLE OF RECORDING IN LANDS AND GROOVES WITHOUT A TRACK-JUMPING OPERATION; OPTICAL INFORMATION RECORDING/ REPRODUCING APPARATUS USING, AND MASTER DISK EXPOSURE APPARATUS FOR PRODUCING THE SAME

BACKGROUND OF THE INVENTION

1. Field of the Invention

The present invention relates to a disk-type optical information recording medium capable of recording optical information, as well as to an optical information recording/ reproducing apparatus which performs either one or both of recording and reproducing operations using the optical information recording medium. The invention also is concerned with a master-disk exposure apparatus for use in the production of the optical information recording medium.

2. Description of the Related Art

Hitherto, various systems have been proposed and used for optically recording and/or reproducing information.

The recording media employed in these systems are broadly grouped according to recording/reproducing method into three types: ROM (read-only), WOROM (overwrite) and R/W (rewritable). Each of these media employs a substrate made of a transparent material such as glass or polycarbonate, and various materials are applied or deposited on the substrate so as to provide functions of the above-mentioned three types. More specifically, a ROM type medium is obtained by depositing, on the substrate, a substance having high reflectivity and superior thermal stability, such as Al. A WOROM type medium is obtained when the material on the substrate exhibits capacity for irreversible reaction, such as, for example, organic colorants. A medium of R/W type is realized by using a material which magnetically or thermally exhibit reversible change, as is the case of a magnetic material or a phase-changeable material which can change from, for example, a crystalline state to an amorphous state and vice versa.

Optical information recording media also can be sorted according to configuration into disk-type media, card-type media and tape-type media. These types of optical information medium have their own advantages so that they are selected according to the use. Among these types of optical information recording media, disk-type media are most popular because of the speed of data transmission.

When a disk-type recording medium is used, data is recorded along a circumferential paths having predetermined lengths and such paths are referred to as a "data track" or simply as a "track". In case of a disk-type information recording medium, the data track can have the form of concentric circles or spiral form. From the view point of continuity of data transfer, however, it is preferred to use a spiral track, particularly when a large volume of data is to be handled.

FIG. 1 illustrates a conventional disk-type optical information recording medium having a spiral track.

Referring to FIG. 1, a disk 100 has guide grooves 103a to 103c spirally formed in the upper surface thereof, such that lands 102a and 102b are left between adjacent spiral grooves 103a to 103c.

In this optical information recording medium, the grooves or the inter-groove portions (lands) are used as data tracks along which a light beam for recording/reproducing information moves so as to record or reproduce information in and from the tracks, whereby a large volume of data can be handled without discontinuity. In recent years, a technique referred to as land/groove recording technique has been developed, in order to cope with the demand for greater data handling capacity. According to this technique, information is recorded both in the groove and on the lands, whereby the recording capacity is doubled.

FIG. 2 is a schematic illustration of a tracking servo system for use in an information recording/reproducing apparatus of the type which uses the optical information recording medium of FIG. 1 as a land/groove recording disk and capable of performing recording in accordance with the aforesaid groove/land recording technique.

Referring to FIG. 2, an optical head 122 associated with a disk 100 has an objective lens 122a, an optical system 122b, a light source 122c and a sensor 122d. The tracking servo system further includes an AT error signal generating circuit 123, a polarity change-over device 128, a phase compensator 129, a switch 130, a control circuit 131, an adder circuit 132, an actuator driver 133, and an actuator 134 which actuates the objective lens 122a so as to move this lens.

The disk 100 has lands and grooves formed in the surface thereof. Information is recorded in and reproduced from both the lands and the grooves.

The objective lens 122a is a pickup lens disposed to oppose the recording surface of the disk 100. A focus servo circuit and a focus actuator which are not shown are operative to control the position of the objective lens 122a such that light emitted from the objective lens 122a is constantly focused in the recording surface of the disk 100.

The light from the light source 122c is condensed through the optical system 122b and the objective lens 122a so as to form a spot of a predetermined diameter on the recording surface of the disk 100. The light reflected from the recording surface is again transmitted through the objective lens 122a so as to be converged on the sensor 122d which converts the light intensity into an electrical signal.

The AT error signal generating circuit 123 generates a tracking error signal based on the electrical signal output from the above-mentioned sensor. A known tracking error detecting method such as push-pull method, 3-beam method and so forth can be employed for the purpose of detecting any tracking error.

A polarity change-over device 128 performs change-over of later-mentioned polarity of the tracking error sinal generated by the AT error signal generating circuit 123. The polarity change-over device 128 is controlled by a control circuit 131 which also will be described later.

The phase compensator 129 performs phase compensation to stabilize the servo in response to the tracking error signal after change-over of the polarity performed by the polarity change-over device 128. The output line of the phase compensator 129 is connected to one of the input terminals of the adder circuit 132 through the switch 130 which operates under the control of the control circuit 131.

The adder circuit 132 has two input terminals to one of which the output line of the phase compensator 129 is connected through the switch 130 as stated above, while the other is connected to the output line of the control circuit 131 the output of which is delivered to the actuator driver 133.

The output signal from the adder circuit 132 is delivered to the actuator driver 133 which operates to convert this signal into an electric current signal in accordance with which the AT actuator 134 is driven to move the objective lens 122a.

The control circuit 131 includes a CPU which performs various controls such as control of turning on and off of the tracking servo and control of the movement of the objective lens 122a towards a target track, as well as the control of switching of the tracking error signal polarity performed by the polarity change-over device 128. The control of turning on and off of the tracking servo is effected by controlling turning on and off of the switch 130. The control of movement of the objective lens 122a towards a target track is performed by generating, while holding the switch 130 off, acceleration pulses for effecting shifting of the objective lens 122a towards the target track, and delivering such pulses to the adder 132. The change-over of polarity of the tracking error signal performed by the polarity change-over device 128 is conducted based on the position of the information track to be used for recording or reproduction, in accordance with the result of determination as to whether the track is a groove or a land.

A brief description will be given of the operation of the tracking servo system.

Light from a light source 122c is condensed through the optical system 122b and the objective lens 122a so as to be focused on the recording surface of the disk 100, thus forming a beam spot of a predetermined diameter. The light in the form of a spot is reflected so as to pass again through the objective lens 122a and is converged on the sensor 122d so as to be changed into an electrical signal. The electrical signal is delivered to the AT error signal generating circuit 123.

Upon receipt of an electrical signal from the sensor 122d, the AT error signal generating circuit 123 generates a tracking error signal based on the received electrical signal. FIG. 3 shows waveform of the tracking error signal generated by the AT error signal generating circuit 123 when the light spot is moved radially inward from an outer peripheral region across the lands and grooves on the recording medium of the type shown in FIG. 1, under such a condition that the focusing servo alone is operative, while the tracking servo is inoperative.

As will be understood from FIG. 3, when the light spot is moved radially inward across consecutive lands and grooves, the tracking error signal has the form of a sine wave which, for example, rises and crosses zero level at the moment at which the beam spot impinges upon the groove 103a and falls to cross the zero level again when the spot is on the center of the adjacent land 102a, the curve then rises and crosses the zero level when the spot passes the adjacent groove 103b. It is thus understood that the polarity of the tracking error signal is inverted depending on whether the beam spot is on the groove or on the land. It is therefore necessary to switch the polarity of the tracking error signal depending on whether a groove or a land is used for the recording/reproduction of information. In the illustrated arrangement, the switching of the tracking error signal is executed in the following manner.

The tracking error signal generated in the AT error signal generating circuit 123 is delivered to the polarity change-over device 128. The control circuit 131 discriminates, based on address information, whether the track to be used for the recording (or reproduction) is a land or a groove, and controls the polarity change-over operation of the polarity change-over device 128 in accordance with the result of the discrimination. As a consequence, the polarity change-over device 128 conducts the change-over of the tracking error signal, based on whether the track is a groove or a land.

The tracking error signal after the change-over of polarity performed by the polarity change-over device 128 is delivered to the phase compensation device 129 for phase compensation, and the resultant signal is delivered to the actuator driver 133 through the switch 130 and the adder circuit 132.

The actuator driver 133 converts the tracking error signal received from the phase compensator 129 into an electrical current signal which drives the AT actuator 134.

The apparatus is ready for recording (or reproduction) of information upon completion of the tracking servo control which is executed in the manner described above.

When recording or reproduction is to be executed on a different track, the switch 130 is turned off by the control circuit 131. The above-described tracking servo becomes inoperative due to turning off of the switch 130. The control circuit 131 generates acceleration pulses in accordance with which the objective lens 121 is moved towards the target track, and these pulses are delivered to the actuator driver 133 through the adder 132.

The actuator driver 133 drives the AT actuator 134 based on the acceleration pulses received from the control circuit 131. As a consequence, the objective lens 122a is moved to focus the target track.

Upon detecting that the movement of the objective lens 122a to the target track is completed, the control circuit 131 turns switch 130 on again, so that the above-described tracking servo control is commenced again.

The known optical information recording medium and information recording/reproducing apparatus using the same encounters the following problems.

Hitherto, in recording information on the optical information recording/reproducing apparatus in accordance with the land/groove recording technique, data to be recorded in the land portion and the data to be recorded in the groove portion are handled separately. Therefore, the volume of data handled continuously at one time is the same as that in conventional systems, although the recording or storage capacity has been increased to a value twice as large that in the conventional systems. It is thus impossible to meet the demand for higher operation speed of the system.

This problem will be discussed in more detail.

Recording of a large volume of data in the optical information recording medium of the type shown in FIG. 1 is conducted, by moving the objective lens 122a radially inward starting from the peripheral region or vice versa. For instance, steps are followed sequentially, such as turning off of the tracking servo, change-over of the tracking polarity, moving the objective lens to the land 102a, turning the tracking servo on, followed by recording of data, turning off of the tracking servo, switching of the polarity of tracking, moving the objective lens to focus the groove 103b, and turning the tracking servo on again, followed by recording of data. Thus, the continuity of the recording/reproducing operation is seriously impaired, because the groove/land polarity change-over operation and a track jump operation have to be executed each time the recording is finished with one track or over one full rotation of the disk.

An alternative way of recording is such that recording is performed without jumping operation such that data is recorded in the land 102a and then in the land 102b and, when the land portion has been fully occupied, the polarity of the tracking signal is changed so as to commence recording in the groove portion starting from the groove 103a, followed by recording in the groove 103b and so forth. In this case, however, the optical head is required to travel a large radial distance from the land at which the recording in the land portion terminates to the groove with which the recording in the groove portion is to be commenced, due to the large radial distance between these lands and grooves. Accordingly, this recording method fails to meet the requirement for higher speed of operation.

SUMMARY OF THE INVENTION

An object of the present invention is to provide an optical information recording medium which permits alternate recording or reproduction in consecutive lands and grooves, by a simple polarity change-over operation, without requiring a track jumping operation.

Another object of the present invention is to provide an optical information recording/reproducing apparatus using such a recording medium.

Still another object of the present invention is to provide a master disk exposure apparatus which is used in the production of the recording medium.

To these ends, according to one aspect of the present invention, there is provided a disk-type optical information recording medium having a plurality of tracks each including a land and a groove. The medium includes a mirror section which divides each of the tracks in the circumferential direction of the disk, wherein the land and the groove are consecutively formed across the mirror section.

According to another aspect of the present invention, there is provided an optical information recording/reproducing apparatus for executing at least one of recording of information in and reproduction of information from a disk-type optical information medium having a plurality of tracks each including a land and a groove which are formed consecutively across a mirror section. The apparatus includes an optical head for irradiating the track on the recording medium with a light beam; a tracking error signal generating circuit for generating a tracking error signal based on the output from the optical head; a mirror section detecting circuit for producing a mirror section detection signal upon detection of the mirror section; a polarity change-over device for switching the polarity of the tracking error signal in response to the mirror section detection signal; and a servo circuit for effecting a tracking servo control of the light beam based on the tracking error signal of the polarity switched by the polarity change-over device.

According to still another aspect of the present invention, there is provided an optical information recording/ reproducing method for executing at least one of recording of information in and reproduction of information from a disk-type optical information medium having a plurality of tracks each including a land and a groove which are formed consecutively across a mirror section. The method includes the steps of irradiating a track on the medium with a light beam; generating a tracking error signal based on the light of the beam reflected by the medium; detecting the mirror section; switching the polarity of a tracking error signal in accordance with the result of detection of the mirror section; and performing a tracking control of the light beam based on the tracking signal of the switched polarity.

According to a further aspect of the present invention, there is provided a master disk exposure apparatus for use in fabrication of a master disk of an optical information recording medium. The apparatus includes a driving mechanism for rotatingly driving a glass master disk with a photosensitive material applied thereto; an exposure system for irradiating the glass master disk with a laser beam to expose the photosensitive material; a traverse feed mechanism for moving the exposure system or the driving mechanism in such a manner as to cause a radial movement of the spot of the laser beam relative to the glass master disk; a demodulating circuit for performing binary coding of the intensity of the laser beam; a modulation period determining circuit for determining the period F of intensity modulation of the laser beam performed by the modulating circuit based on the period T of rotation of the glass master disk. The period F meets the following condition:

$$F=2T/(2n-1)$$

(n being a natural number).

These and other objects, features and advantages of the present invention will become clear from the following description of the preferred embodiments when the same is read in conjunction with the accompanying drawings.

BRIEF DESCRIPTION OF THE DRAWINGS

FIGS. 4(a) and 4(b) are illustrations of a first embodiment of the optical information recording medium in accordance with the present invention in which FIG. 4(a) is a schematic illustration of a track formed on the recording surface of a disk, while FIG. 4(b) is an enlarged view of a part of the track shown in FIG. 4(a);

FIGS. 6(a) and 6(b)(1)–6(b)(6) are illustrations of operation of the information recording/reproducing apparatus of FIG. 5, in which FIG. 6(a) shows a state in which a beam spot has moved across a land and a groove, while FIGS. 6(b)(1)–6(b)(6) are waveform charts showing waveforms of signals as obtained by the movement of the beam spot across the land and the groove;

FIGS. 14(a) to 14(c) are illustrations of a super-resolution technique as disclosed in Japanese Patent Laid-Open No. 6-124500, in which FIG. 14(a) is a schematic sectional view of an opto-magnetic disk in a state in which a recording surface of the disk is irradiated with a reproducing light beam, FIG. 14(b) is a schematic illustration of the recording surface of the disk under the condition shown in FIG. 14(a), and FIG. 14(c) is a diagram showing temperature distribution at the track center under the condition shown in FIG. 14(b);

FIGS. 15(a) to 15(c) are illustrations of a super-resolution technique as disclosed in Japanese Patent Laid-Open Nos. 3-93058 and 4-255946, in which FIG. 15(a) is a schematic sectional view of an opto-magnetic disk in a state in which a recording surface of the disk is irradiated with a reproducing light beam, FIG. 15(b) is a schematic illustration of the recording surface of the disk under the condition shown in FIG. 15(a), and FIG. 15(c) is a diagram showing temperature distribution at the track center under the condition shown in FIG. 15(b);

FIGS. 19(a)–19(e) are waveform charts showing waveforms of signals outputted from a demultiplying circuit 457, a toggle flip-flop 459, a PLL circuit 562, a monostable multivibrator (MSMV) 563 and a gate circuit 564, which are incorporated in the optical disk master exposure apparatus of FIG. 17, illustrative of the period of modulation of an AOM 542 incorporated in the apparatus.

DESCRIPTION OF THE PREFERRED EMBODIMENTS

Figure 1:
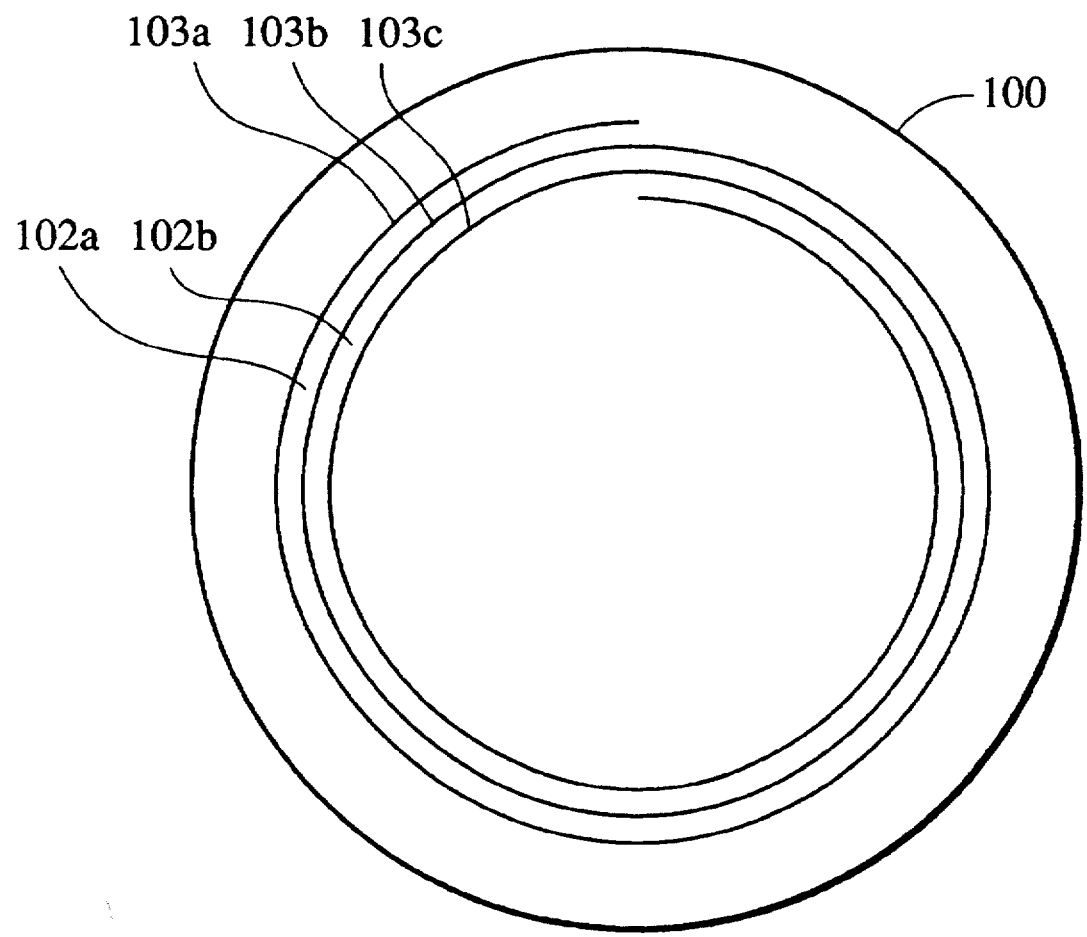
FIG. 1 is an illustration of a conventional disk-type optical information recording medium having a spiral track formed therein.

Preferred embodiments of the present invention will be described with reference to the accompanying drawings.

First Embodiment

FIGS. 4(a) and 4(b) are illustrations of a first embodiment of the optical information recording medium in accordance with the present invention in which FIG. 4(a) is a schematic illustration of a track formed on the recording surface of a disk, while FIG. 4(b) is an enlarged view of a part of the track shown in FIG. 4(a).

Referring to these Figures, a disk 1 has been fabricated by forming, on a light-transmitting substrate having a pre-groove formed therein and made of, for example, a polycarbonate, a protective layer and a recording layer. Substantially spiral discontinuous grooves 3a to 3c have been formed to extend in the circumferential direction of the disk, such that lands 2a and 2b are formed between adjacent grooves. The discontinuities of the grooves are aligned along a radial line, and these aligned discontinuities provide a mirror section which is denoted by 4. The grooves 3a to 3c and the lands 2a, 2b form a track. More specifically, the terminal end of the groove 3a is followed by the starting end of the land 2a across the mirror section 4. Likewise, connections across the mirror section 4 are made between the terminal end of the land 2a and the starting end of the groove 3b, between the terminal end of the groove b and the starting end of the land 2b, and between the terminal end of the land 2b and the starting end of the groove 3c, whereby a spiral track is of formed. Although single tracks represented by the grooves 3a to 3c and lands 2a, 2b are shown, a greater number of such tracks are formed on the disk 1.

In the optical information recording medium described above, the mirror section 4 has a circumferential length which is small enough to ensure that the servo remains without coming off but large enough to accommodate the spot of the pickup light beam so as to prevent the spot from bridging the grooves. The mirror section 4 provides a distinctively greater value of a later-mentioned sum signal than other sections. A 90° spatial phase deviation is created between the land and between the grooves, across this mirror section 4.

The mirror section 4 is intended to provide the following effects (1) to (3):

(1) When the beam spot is moved from a groove to the adjacent land across the mirror section, any noise to the pickup light, generated by the end edge of the groove, can be dissipated when the beam spot moves across the mirror section.

(2) Polarity of the tracking error signal has to be switched when the beam spot which has traced a land starts to trace a groove. Detection of the mirror section gives a cue to the control for the switching of the polarity.

(3) The time required for the beam spot to travel across the mirror section can be used as the time which is necessary for the operation to switch the polarity of the tracking error signal.

A description will now be given of the operation for recording and reproducing information in and from this disk 1.

For the purpose of simplification of explanation, the land 2a is termed as a track n, and the adjacent grooves 3a and 3b are respectively termed as tracks n−1 and n+1. Likewise, the land 2b adjacent to the groove 3b is termed as a track n+2 and the groove 3c as a track n+3.

It is assumed here that the disk starts to rotate clockwise, while the beam spot is located at a position (referred to as "starting end") which is the portion of the track n on the left side of the mirror section 4 as viewed in FIG. 4(a). Consequently, a relative movement is caused between the disk 1 and the beam spot so that the beam spot traces the track n counterclockwise. After about 360° rotation of the disk, the beam spot is located at a position (referred to as "terminal end") on the end edge of the track n which is on the right side of the mirror section 4.

In this embodiment, the circumferential length of the mirror section 4 has been determined so as not to cause the servo to come off the control, so that the beam spot moves substantially linearly across the mirror section as the disk 1 further rotates. As a consequence, the beam spot which has entered the mirror section 4 from the edge of the track n on the right side of the mirror section 4 (terminal end) linearly moves into the starting end of the track n+1 which is on the left side of the mirror section 4. A further rotation of the disk causes the beam spot to shift from the track n+1 to the track n +2. Thus, in the optical information recording medium of this embodiment, the beam spot can alternately and consecutively trace successive land and groove, without requiring a track jump operation. It is therefore possible to handle a large volume of data at a high speed, while enjoying the merit of the land/groove recording technique.

Figure 5:
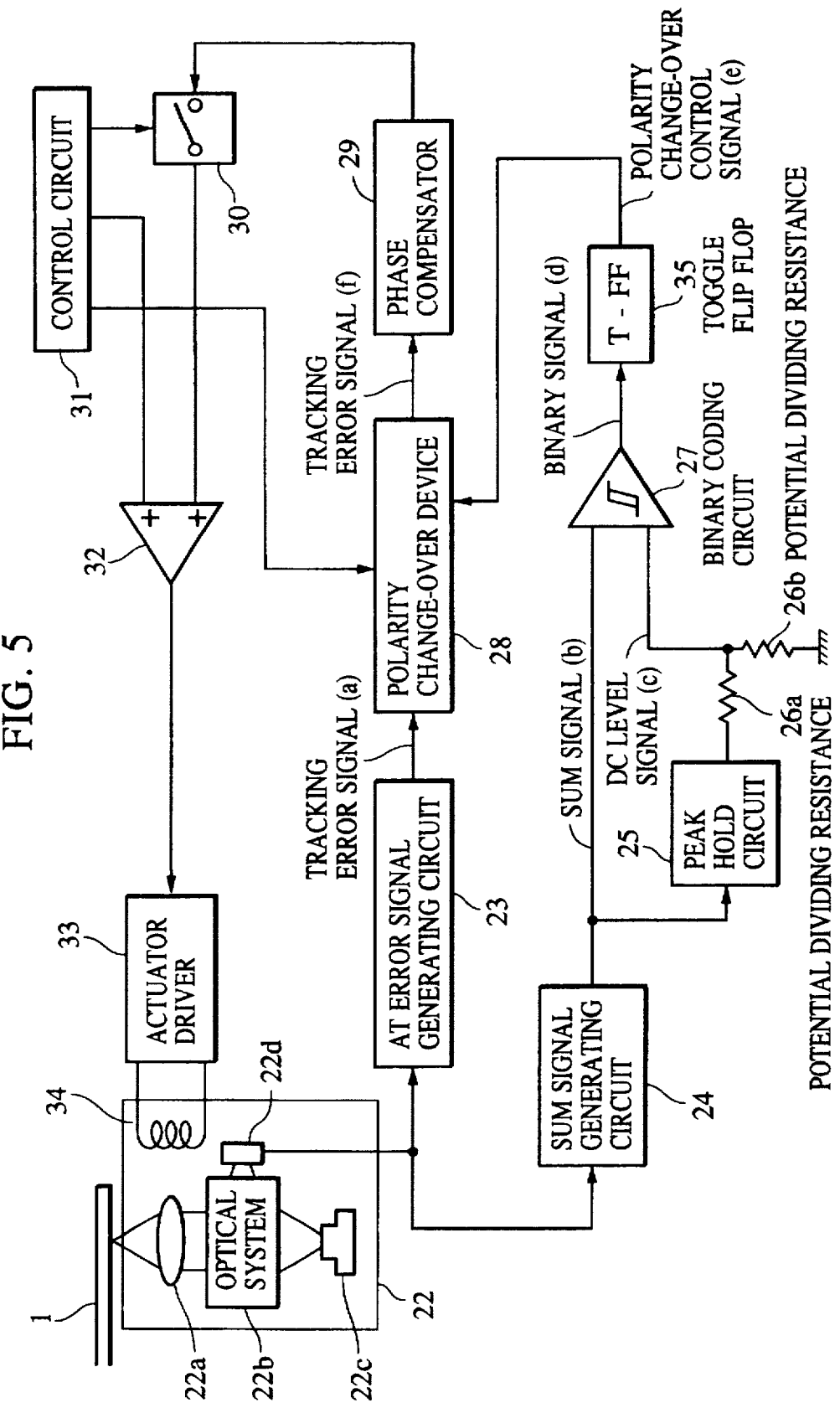
FIG. 5 is a block diagram showing the construction of a tracking servo system employed in an information recording/reproducing apparatus of the present invention for recording and reproducing optical information in and from the optical information recording medium shown in FIG. 1.

FIG. 5 is a block diagram showing the construction of an example of the tracking servo system used in an information recording/reproducing apparatus of the invention which performs recording and reproduction of information in and from the optical information recording medium shown in FIG. 4.

Referring to FIG. 5, an optical head 22 associated with a disk 1 has an objective lens 22a, an optical system 22b, a light source 22c and a sensor 22d. The tracking servo system further includes an AT error signal generating circuit 23, a sum signal generating circuit 24, a peak hold circuit 25, potential-dividing resistors 26a and 26b, a binary coding circuit 27, a polarity change-over device 28, a phase compensator 29, a switch 30, a control circuit 31, an adder circuit 32, an actuator driver 33, an actuator 34 and a toggle flip-flop 35.

The disk 1 is an optical information recording medium of the type shown in FIG. 4. Data is recorded in and reproduced from both the lands and the grooves formed in the recording surface of the disk 1.

Figure 2:
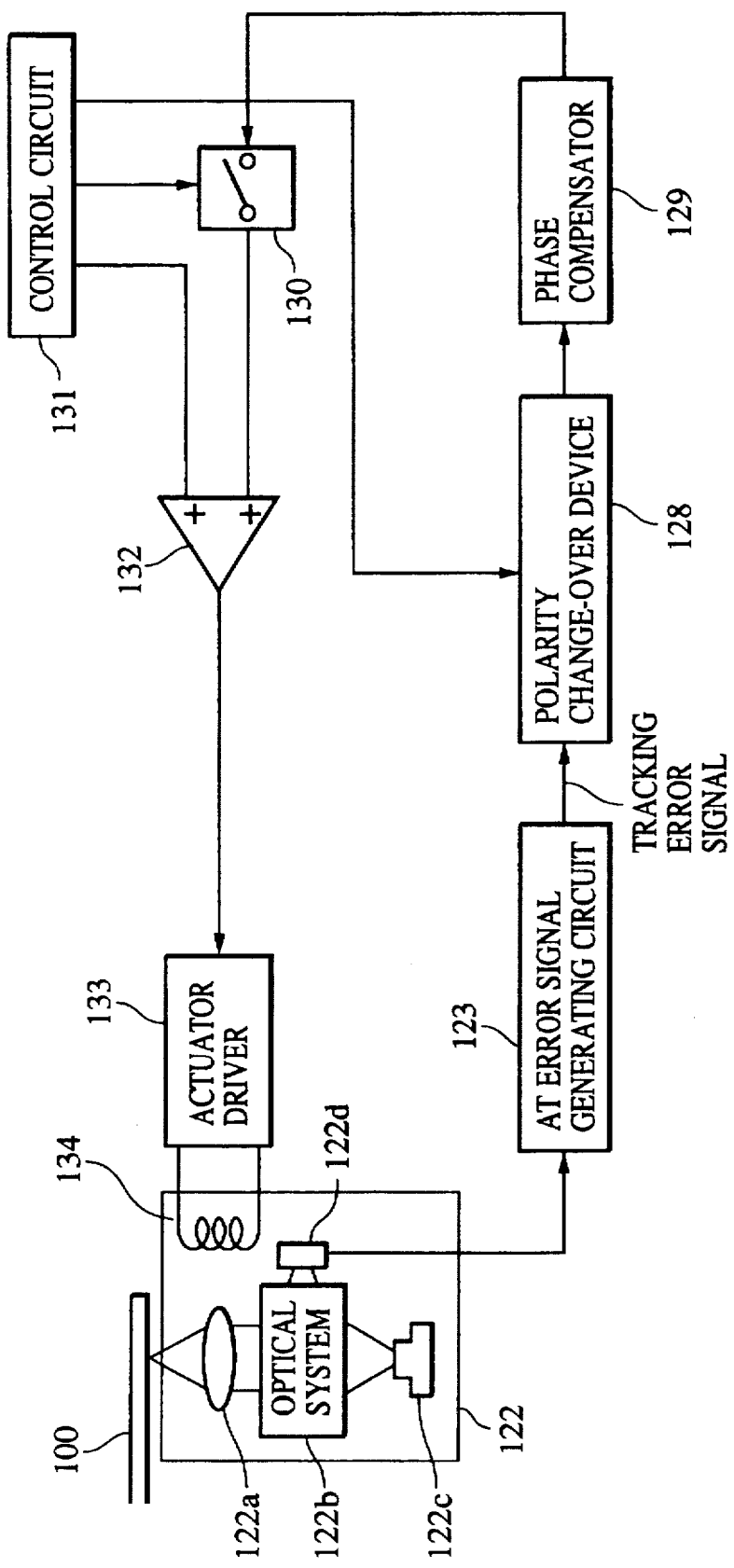
FIG. 2 is block diagram schematically showing the construction of a tracking servo system used in an optical information recording/reproducing apparatus which performs recording/reproduction of information in and from the optical information recording medium of FIG. 1 in accordance with land/groove recording technique.
Figure 3:
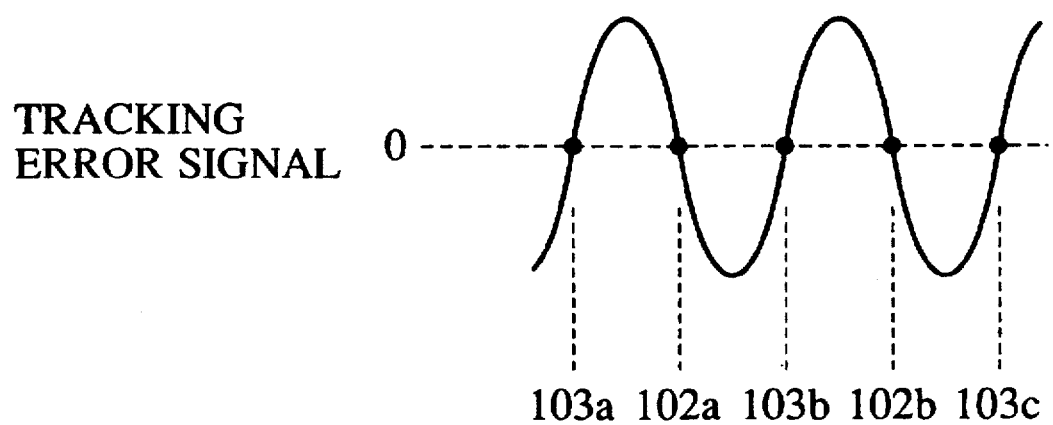
FIG. 3 is a waveform chart showing the waveform of a tracking error signal which is generated when a beam spot is moved relative to the recording medium of FIG. 1 across consecutive lands and grooves formed on the recording medium.

The components such as the objective lens 22a, optical system 22b, light source 22c, sensor 22d, AT signal generating circuit 23, polarity change-over device 28, phase compensator 29, switch 30, control circuit 31, adder circuit 32, actuator driver 33 and the actuator 34 are the same as those employed in the conventional apparatus described before in connection with FIG. 2, so that a detailed description of these components is omitted. In the conventional apparatus shown in FIG. 2, the change-over of the tracking error signal is conducted by the polarity change-over device 28 under the control of the control circuit which determines whether the track in which data is to be recorded or from which data is read is a groove or a land, based on the address information pertaining to the track. In this embodiment, however, a later-mentioned polarity change-over control section also takes part in the control of switching of the polarity. In addition, in the following description, the output from the AT error signal generating circuit 23 will be referred to as a "tracking error signal (a)", while the output from the polarity change-over device 28 will be referred to as a "tracking error signal (f)".

The polarity change-over control section controls the polarity switching operation performed by the polarity change-over device 28. This section includes the sum signal generating circuit 24, peak hold circuit 25, potential-dividing resistors 26a, 26b, binary circuit 27 and the toggle flip-flop 35.

Each of these components of the polarity change-over section will be described in detail.

The sum signal generating circuit 24 generates a sum signal (b) based on the electrical signal output from the sensor 22d. The manner of summing performed by the sum signal generating circuit varies according to the tracking system employed. For instance, when a push-pull type tracking system is employed, the sum is obtained as the sum of outputs from the two sections of a split photo-detector or from four sections of a quadrant photodetector. The sum signal (b) output from the sum signal generating circuit 24 is delivered to the peak hold circuit 25 and also to one of input lines of the binary-coding circuit 27.

The peak hold circuit 25 is adapted to hold the peak value of the received sum signal. The output from the peak hold circuit 25 is delivered to the other input line of the binary coding circuit 27 via the potential-dividing resistors 26a, 26b. The potential-dividing resistor 26a has one end connected to the output line of the peak hold circuit 25 and the other end connected to the above-mentioned other input line of the binary coding circuit 27. The above-mentioned other end of the resistor 26a is connected to one end of the potential-dividing resistor 26b, the other end of which is grounded. The peak value of the sum signal delivered by the peak hold circuit 26 is appropriately divided by the potential-dividing resistors 26a, 26b to form a DC level signal (c) which is delivered to the binary coding circuit 27.

One of the input lines of the binary coding circuit 27 receives the sum signal (b) coming from the sum signal generating circuit 24, while the other input line of the same receives the DC level signal (c) which is transmitted thereto through the potential-dividing resistors 26a, 26b. The binary coding circuit 27 compares these two inputs and generates a binary signal (d) which triggers the toggle flip-flop 35.

The toggle flip-flop 35, triggered by the binary signal (d) delivered by the binary coding circuit 27, generates a polarity change-over control signal (e) which controls the polarity switching operation performed by the polarity change-over device 28. Thus, the polarity is changed-over by the polarity change-over device 28 based on the polarity change-over control signal (e) derived from the toggle flip-flop circuit 35.

A description will now be given of the operation of the information recording/reproducing apparatus, for each of a seeking operation and a tracing operation.

(1) Seeking operation

FIGS. 6(a) and 6(b)(1)–6(b)(6) are diagrammatic illustrations of an information recording/reproducing apparatus. FIG. 6(a) shows the manner in which a beam spot has moved radially inward from an outer peripheral region, starting from a groove 3a to reach a land 2d, across lands and grooves, under such a condition that the focusing servo alone is operative, i.e., when the tracking servo is not operative. FIGS. 6(b)(1)–6(b)(6) are waveform charts showing waveforms of the tracking error signal (a) (FIG. 6(b)(1)), sum signal (b) (FIG. 6(b)(3)), DC level signal (c) (FIG. 6(b)(2)), binary signal (d) (FIG. 6(b)(4)), polarity change-over control signal (e) (FIG. 6(b)(5)), and the tracking error signal (f) (FIG. 6(b)(6)), as obtained in accordance with the movement of the beam spot shown in FIG. 6(a).

To simplify explanation, an assumption is made here that the direction of the component of velocity of the beam spot relative to the track, along the disk radius, does not change across the mirror section 4. The arrangement may be such that the radial component of velocity of the beam spot relative to the track is nullified at the very moment when the beam spot is on the mirror section 4. Such an arrangement is within the scope of the present invention.

A description will be given first of the waveforms of the above-mentioned signals as obtained when the beam spot is moved in the radial direction across the land/groove, from a spot position ① to a spot position ④.

The tracking error signal (a) derived from the AT error signal generating circuit 23 rises to cross the zero level at the spot position ① and falls to cross the zero level at the spot position ②. The signal (a) rises again to cross the zero level at the spot position ③ and falls to cross the zero level at the spot position ④. Thus, the tracking error signal (a) has a regular periodic (sine) waveform.

The sum signal (b) provided by the sum signal generating circuit 24 also has a sine waveform. This waveform exhibits minimum value at the beam position where the rising tracking error signal (a) crosses the zero level and maximum value at the beam position where the falling tracking error signal (a) crosses the zero level. The level of the sum signal (b) remains below the level of the DC level signal (c) when the beam spot is above a land or a groove. The DC level signal (c) is formed by the potential-dividing resistors 26a, 26b from the signal delivered by the peak hold circuit 25, so that the binary coding circuit 27 outputs a 0 (zero)-level signal as the binary signal (d) when the beam spot is above a land or a groove. Since the binary signal (d) from the binary circuit 27 is kept at "0" while the beam spot passes from beam position ① to beam position ④, the polarity change-over control signal (e), output from the toggle flip-flop 35, also is held at "0" during this period.

As described, the polarity change-over device 28 does not perform the polarity change-over operation, as long as the polarity change-over control signal (e) from the toggle flip-flop circuit 35 is kept at "0". Consequently, the polarity remains without switching. Consequently, the tracking error signal (a) from the AT error signal generating circuit 23 is outputted as it is, as the tracking error signal (f).

A description will now be given of the signal waveforms as obtained when the beam spot is moved across the mirror section 4 from the beam position ④ to the beam position ⑦.

The level of the tracking error signal (a) output from the AT error signal generating circuit 23 is lowered to "0" when the beam spot passes the mirror section 4. At the same time, when the beam spot moves across the mirror section, the phase of the tracking error signal (a) is shifted 180° in accordance with the phase difference between the lands. As a consequence, the waveform of the tracking error signal exhibits a 180° phase shift (inversion) at the beam spot position corresponding to the mirror section 4, as will be seen from FIG. 6(b)(1).

When the beam spot is on the mirror section 4, the beam spot does not infringe upon the adjacent grooves. Therefore, in this case, the level of the sum signal (b) output from the sum signal generating circuit 24 is not affected by diffraction and, hence, is higher by an amount corresponding to the effect of diffraction than that of the sum signal (b) obtained at the spot points ② and ④ where the beam infringes adjacent grooves to suffer from the effect of diffraction. Consequently, the level of the sum signal (b) obtained when the beam spot is on the mirror section 4 exceeds the level of the DC level signal (c) formed by the potential-dividing resistors 26a, 26b from the output of the peak hold circuit 25. Thus, the level of the sum signal (b) exceeds the level of the DC level signal (c) only when the beam spot is on the mirror section 4, as will be seen from FIGS. 6(b)(2) and 6(b)(3).

After the beam spot has left the mirror section 4, the sum signal (b) follows a sine curve which takes the minimum value when the rising tracking error signal (a) crosses the zero level and the maximum value when the falling tracking error signal (a) crosses the zero level.

The foregoing description is based on an assumption that, as in ordinary substrates, the reflectivity of the lands is greater than that of the grooves. In the actual substrate of land/groove recording type, curves of clear sine forms as shown in FIGS. 6(b)(1)–6(b)(6) may not be obtained, because the width ratio between the land and the groove is set to about 1:1, in order to obtain uniform quality of the recorded signal. What is important, however, is the fact that the reflectivity of the mirror section 4 is greater than those of other portions so that the mirror section 4 is detected as a change in the level of the sum signal (b), rather than the fact that a certain amplitude of the sum signal is obtained.

Upon receipt of the above-mentioned sum signal (b) from the sum signal generating circuit 24, the binary coding circuit 27 produces a binary signal (b) the level of which varies as follows. Namely, when the beam spot is moving on the mirror section 4, the level of the sum signal (b) exceeds the level of the DC level signal (c), so that a signal of "1" level is output as the binary signal (d) and, after the beam spot has left the mirror section 4, "0" is again continuously outputted as the binary signal (d), since the level of the sum signal (b) is always held below the level of the DC level signal (c) except when the beam spot is on mirror section 4.

Upon receipt of the binary signal (d) from the binary coding circuit 27, the toggle flip-flop 35 operates, being triggered by the rise of the binary signal (d), so as to change the level of the polarity change-over control signal (e) from "1" to "1".

In response to the "1" level of the polarity change-over control signal (e) from the toggle flip-flop 35, the polarity change-over device 28 performs change-over of the polarity, so as to invert the tracking error signal (a) output from the AT error signal generating circuit 23, and the thus inverted signal is output as the tracking error signal (f). Once the polarity is changed, the polarity is maintained until "1" is output as the binary signal (d). As a consequence, the tracking error signal (f) without phase discontinuity across the mirror section 4 is obtained as shown in FIG. 6(b)(6).

In this embodiment, the spatial phase shift (180° deviation) of the tracking error signal caused when the beam spot is moved across the mirror section 4 is compensated for, because the polarity of the tracking error signal is switched by the polarity change-over device 28 which operates in response to the signal indicative of detection of the beam spot passing the mirror section 4, so as to provide the waveform of the tracking error signal (f) having no phase discontinuity. Thus, counting of the number of the tracks in, for example, a seeking operation can be conducted by a conventional method, without requiring use of any special algorithm.

The polarity change-over device 28 receives a control signal also from the control circuit 31, so that the beam spot can be moved between lands and between grooves without passing the mirror section.

Waveforms of signals have been described on an assumption that the tracking servo has not been put to effect. In an ordinary tracing operation, however, tracking servo control is executed simultaneously with the seeking operation. The tracking servo control can be performed by using a circuitry which is similar to that described above and capable of detecting the mirror section. The polarity of the tracking error signal is switched in response to detection of the mirror section, so that the tracking error signals are smoothly connected without discontinuity when the beam spot is moved from a land to an adjacent groove and from a groove to an adjacent land. A brief description will be given as to the tracing operation.

(2) Tracing operation

It is assumed here that the light spot is at the spot position ① on the groove 3a shown in FIG. 6(a) and the level of the polarity change-over control signal (e) has been set to "0". The beam spot then moves along the groove 3a and enters the land 2a across the mirror section 4. The operation performed in this case is as follows.

When the beam spot is at the beam position ① in the groove 3a, the level of the tracking error signal (a) derived from the AT error signal generating circuit 23 is "0". It is assumed here that the polarity change-over device 28 has been set to provide the polarity which is used when the track is a groove.

The beam spot moves in the circumferential direction along the groove 3a so that it radially deviates from the spot position ① which is on the center of the track. This deviation cause a change in the tracking error signal (a), and the tracking control is performed based on the change in the tracking error signal (a).

By way of example, it is assumed here that the beam spot is deviated radially inward of the disk, with the result that the level of the tracking error signal (a) is changed to "0.1 V". The tracking error signal of 0.1V is delivered to the actuator driver 33 through the phase compensator 29, switch 30 and the adder circuit 32. The actuator driver 33 converts the received tracking error signal into an electric current which drives the AT actuator 34, thereby shifting the objective lens radially outward, i.e., towards the center of the track. This operation is repeated so that the tracking is performed.

When the beam spot is moved under the described tracking control, the following changes are caused in the tracking error signal (a), sum signal (b), DC level signal (c), binary signal (d), polarity change-over control signal (e) and the tracking error signal (f).

The beam spot moves along the groove 3a to enter the mirror section 4. As a consequence, the level of the sum signal (b) derived from the sum signal generating circuit 24 exceeds the level of the DC level signal (c), so that a signal of the level "1" is output as the binary signal (d) from the binary circuit 27.

Upon receipt of the binary signal (d) of the "1" level from the binary circuit 27, the toggle flip-flop 35, being triggered by the rise of the binary signal (d), operates to change the level of the polarity change-over control signal (e) from "0" to "1".

The change of the level of the polarity change-over control signal (e) from "0" to "1" causes the polarity change-over device 28 to switch the polarity of the tracking error signal from the polarity for grooves to the polarity for lands. Thus, the tracking error signal (a) from the AT error signal generating circuit 23 is inverted and output as the tracking error signal (f). Thus, a change in the level of the polarity change-over control signal (e) is triggered by the value of the sum signal (b) indicative of the beam spot moving on the mirror section 4, thereby causing the polarity change-over device 28 to switch the polarity of the tracking error signal.

For instance, when the spot which has passed the mirror section 4 has been offset radially inward as in the foregoing description, the error signal takes the level of "−0.1 V", because the spatial phase difference of 180° exists between the land traced by the beam spot before the latter enters the mirror section 4 and the groove which is going to be traced by the beam spot. However, since the polarity has been switched as result of detection of the beam spot passing the mirror section 4, a tracking error signal of "0.1 V" is obtained after the switching of polarity, whereby an accurate tracking servo control is performed.

As will be understood from the foregoing description, when the beam spot moves from a land onto a groove and from a groove onto a land across the mirror section 4, the passage of the beam spot over the mirror section 4 is detected so as to trigger the change-over of the polarity of the tracking error signal from the polarity for lands to the polarity for grooves and vice versa, thus allowing a smooth transition from the tracing of a land to the tracing of a groove and from a groove to a land.

A technique has been known for stabilizing start-up of a tracking servo based on a track crossing signal and the beam spot velocity in the track crossing direction. Accurate detection of velocity can be performed in this case, by using the tracking error signal (f) obtained through change-over of polarity.

As will be understood from the foregoing description, the optical information recording medium of this embodiment makes it possible to store a large volume of information without impairing high speed of data transfer. This advantage can equally be enjoyed with all types of optical information recording media including ROM, WORM and R/W mentioned before, and can be achievable not only with disk-shaped media but also with media having a different shape, e.g., a card, provided that the data tracks are in a spiral form.

Furthermore, by using the tracking servo system as described, it is possible to obtain a high-speed, large-capacity information recording/reproducing apparatus, by making full use of the advantages of the above-described optical information recording medium.

Second Embodiment

Figure 7:
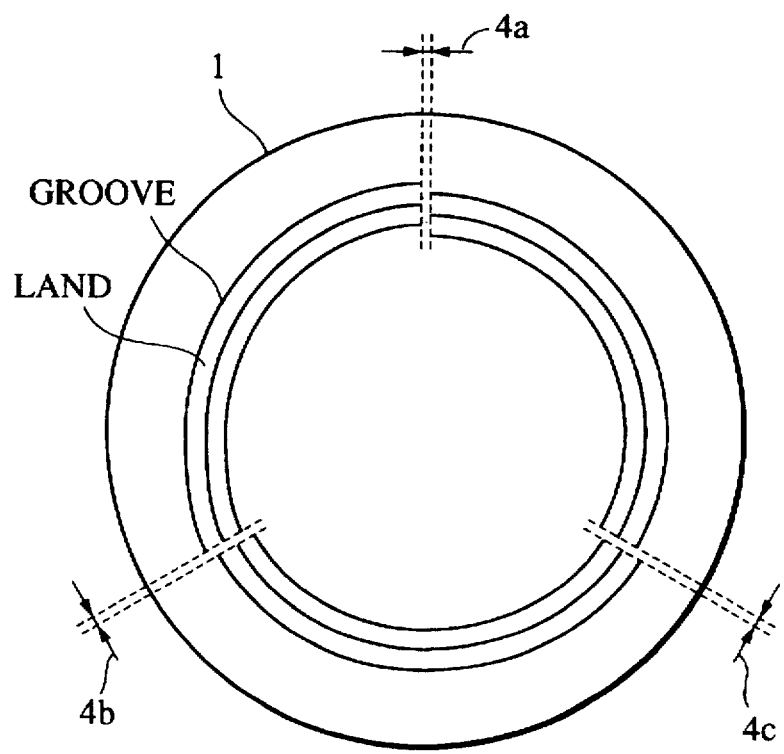
FIG. 7 is a schematic illustration of the second embodiment of the optical information recording medium in accordance with the present invention.

FIG. 7 shows a second embodiment of the optical information recording medium in accordance with the present invention.

This optical information recording medium has three mirror sections 4a, 4b and 4c which are equi-spaced in circumferential direction, each being the same as the mirror section 4 shown in FIGS. 4(a) and 4(b). In operation, a beam spot which has traced, for example, a groove starts to trace a land after transition across the mirror section 4a and, after passing the mirror section 4b, commences tracing of a groove with switching of the polarity of tracking error signal. The polarity is switched again as the beam spot crosses the mirror section 4c so as to start tracing of a land. The beam spot then reaches the mirror section 4a as a result of further rotation of the disk, and the polarity switches again when the beam spot crosses the mirror section 4a. It is thus possible to trace consecutive lands and grooves alternately per each rotation of the disk.

The first embodiment described before employs a single mirror section, while the second embodiment employs three. As will be readily understood from these illustrations, the first and second embodiments are only illustrative and the invention can be realized when the arrangement is such that the beam spot encounters an odd number of mirror sections during one rotation of the disk.

Regardless of the number of the mirror sections, the information recording/reproducing apparatus can be most conveniently be realized by arranging such that the switching of tracking polarity is triggered by detection of passage of the beam spot over each mirror section, through sensing the level of the sum signal (b), because this method of detection of the mirror section is simplest and most reliable. This method of polarity change-over, however, is not exclusive and various other methods are usable.

For instance, when the mirror sections are aligned along a radial line or lines as in the first and second embodiments, the detection of the mirror section or sections is performed through sensing a mark which is provided on the radially outer or inner end of the above-mentioned radial line or lines along which the mirror sections are aligned, so as to indicate the position or positions of the mirror sections. The mark may be a tiny piece of a material having an optical constant, e.g., reflectivity, different from that of the medium material or may be presented by locally changing the configuration of the substrate. In such a case, the information recording/reproducing apparatus is equipped with a mirror section detector sensitive to the above-mentioned mark, provided separately from the tracking beam system, and the polarity of the tracking error signal is switched in response to an output signal from the mirror section detector. It is thus possible to obtain a high-speed, large capacity disk of the present invention.

Third Embodiment

Figure 8:
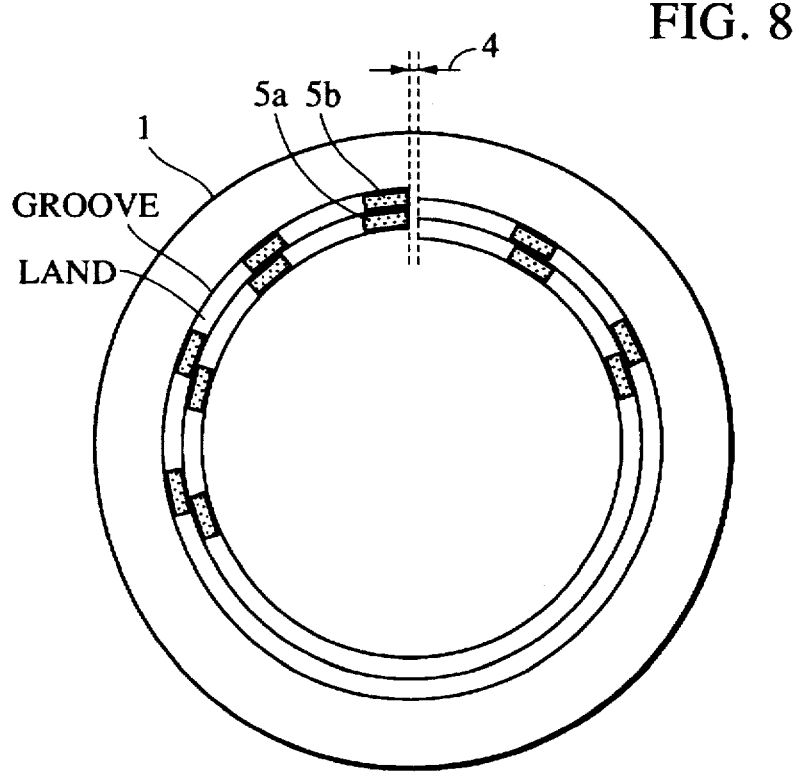
FIG. 8 is a schematic illustration of a third embodiment of the optical information recording medium in accordance with the present invention.

FIG. 8 schematically shows the construction of a third embodiment of the optical information recording medium in accordance with the present invention.

Referring to FIG. 8, sector header portions are denoted by 5a and 5b. In order to facilitate administration of data recorded in the information recording medium, the entire storage area of the medium is divided into a plurality of blocks each having a capacity of several hundred to several kilo bytes. Each such block is referred to as a "sector". Each sector is composed of a header portion and a data portion which follows the header portion. In operation, the information recording/reproducing apparatus makes access to a target position based on the position of the sector, track number and so forth recorded in the sector header, in order to record or reproduce information in and from the data portion which follows the accessed header portion. Thus, the sector header and the data which follows the sector header are handled as a unitary data block.

In the first and second embodiments of the optical information recording medium, the beam spot essentially crosses an edge of a groove when it leaves a mirror section 4 or when it enters the mirror section. Therefore, if a mirror section exists in the data bit region of the header portion or in the data portion of a sector, i.e., if the train of data bits is interrupted by the mirror section, noise which is generated when the beam spot moves across the groove edge may be introduced to the data recorded in or reproduced from the data bits to cause an error, thus hampering recording and reproduction of data.

In order to obviate this problem, in the information recording medium of this embodiment, the mirror portion 4 is disposed between sectors which neighbor each other in the tracking direction. Neither recording nor reproduction is performed when the beam spot is on the mirror section. It is thus possible to carry out the invention while avoiding undesirable effect of groove edge noise which otherwise may be caused during recording and reproduction.

Although the optical information recording medium shown in FIG. 8 has only one mirror section, the invention does not exclude provision of a plurality of mirror sections which are spaced in a circumferential direction, for the same reason as stated before in connection with the second embodiment.

Fourth Embodiment

Figure 9:
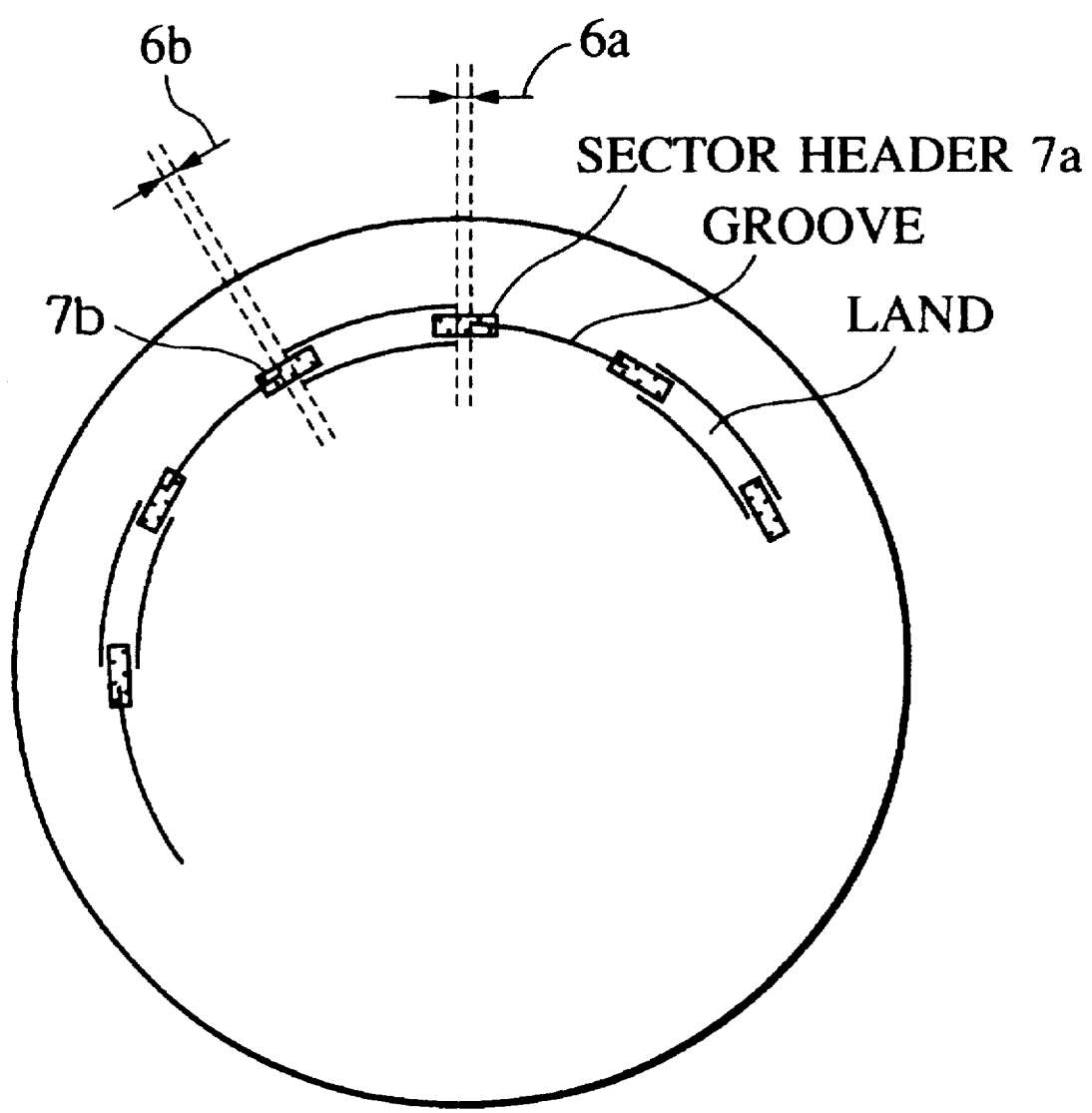
FIG. 9 is a schematic illustration of a fourth embodiment of the optical information recording medium in accordance with the present invention.

FIG. 9 schematically shows the construction of a fourth embodiment of the optical information recording medium of the present invention.

In the optical information recording medium of this embodiment, each sector header portion has a mirror section. For example, sector header portions 7a and 7b have mirror sections 6a and 6b, respectively. The sector header portion stores various kinds of information in accordance with a predetermined format, and a mirror section, which switches spatial phase between a land and a groove, is intentionally included in the format. Recording and reproduction of information can be performed without being affected by the presence of the mirror section, provided that an algorithm or rule is beforehand implemented such that recording of information is not conducted when the beam spot is on the mirror section. In this case, the above-mentioned rule is preferably determined such that recording of information is not executed in the regions of grooves adjacent to the mirror section.

In this embodiment, each sector has its own mirror section. It is therefore possible to use the mirror section for other purposes than the switching of spatial phase. For instance, the tracking error signal obtained when the beam spot crosses the mirror section can be used for the purpose of removal of offset.

It is to be understood, however, that the present invention essentially requires that the number of the mirror sections appearing in one full rotation of the disk is an odd number. This embodiment may be carried out in accordance with a ZCAV (Zoned Constant Angular Velocity) technique in which the number of sectors is progressively changed in the circumferential direction of the disk so as to increase the storage capacity. In such a case, each zone preferably includes an odd number of sectors. However, there may be cases where an even number of sectors are employed, in order to obtain as large a storage capacity as possible. In such a case, it is advisable to provide or omit mirror sections only in selected sectors so that the total number of the mirror sections is an odd number.

In the case where the mirror section is intended to be used also for another purpose such as removal of offset, it is essential to provide a mirror section in each of the sectors. In such a case, an arrangement is made such that the inversion of spatial phase between a land and a groove across the mirror section is not performed in a selected sector, so that the inversion of the spatial phase takes place an odd number of times during one full rotation of the disk. In such an arrangement, however, it is necessary that a special mark is provided on such a selected sector so as to discriminate this sector, and to provide on the information recording/reproducing apparatus a suitable sensor capable of sensing such a special mark.

The optical information recording medium of the invention described above enables full use of advantages possessed by CAV (Constant Angular Velocity) disks and the above-mentioned ZCAV disks in which storage area of the disk is divided in the radial direction into a plurality of zones and disk speed is increased when the beam spot is on a radially outer zone. By applying the invention to these types recording media, it is possible to obtain an optical information recording/reproducing apparatus which can handle a large volume of information at a high speed.

Fifth Embodiment

The fifth embodiment pertains to a formatting of the optical information recording medium of the invention which has been described.

Figure 10:
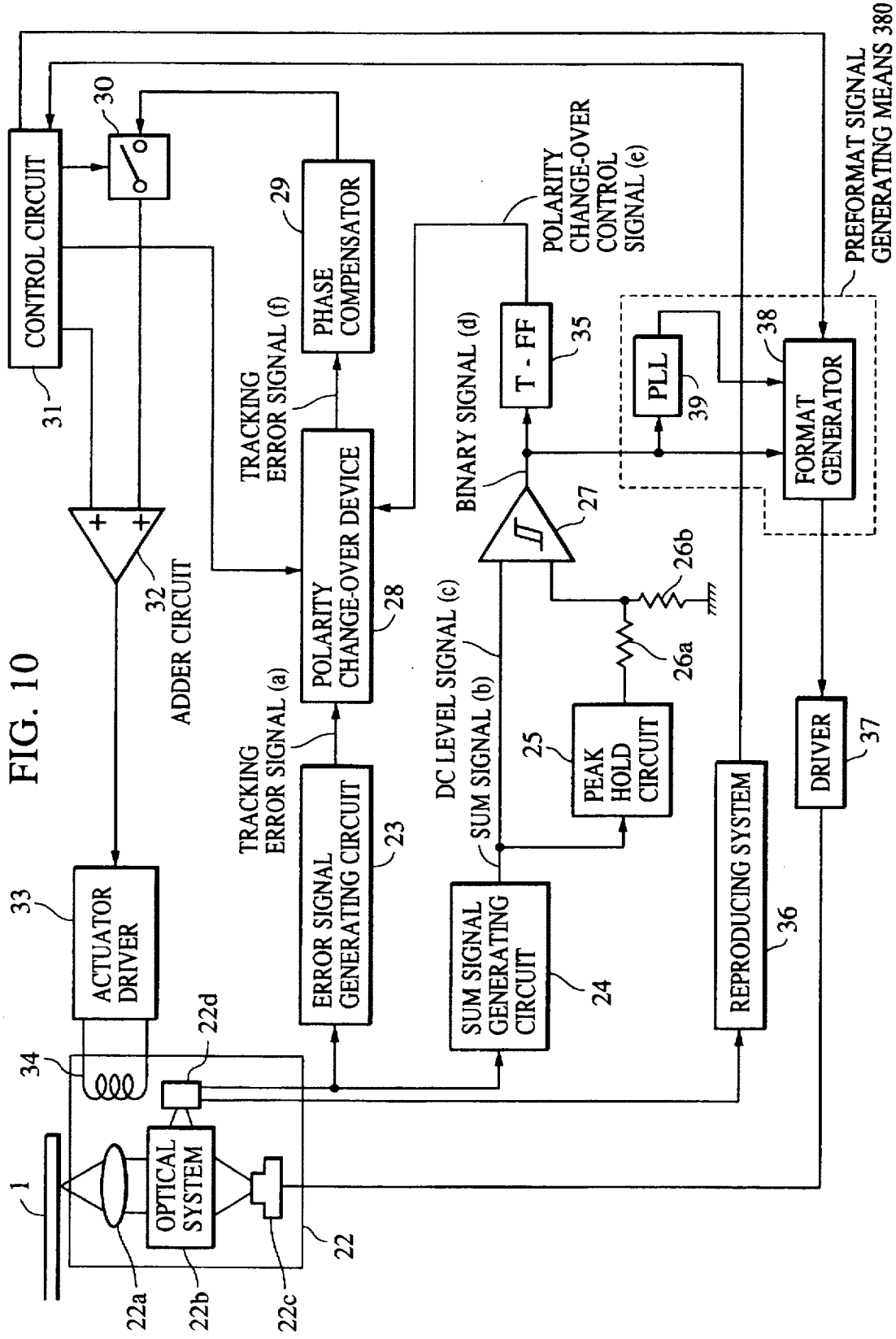
FIG. 10 is a block diagram schematically showing the construction of an optical information recording/ reproducing apparatus as a fifth embodiment of the present invention.

FIG. 10 is a block diagram showing the detail of the construction of an optical information recording/reproducing apparatus as the fifth embodiment of the present invention. In this Figure, components and elements which are the same as those in the foregoing description are denoted by the same reference numerals as those appearing in the foregoing description, and detailed description of function and operation is omitted with such components and elements.

Preformat signal generating means 380 generates a preformat signal which is in phase with the binary signal (d)

derived from the binary coding circuit 27 described before. The preformat signal generating means includes a format generator 38 and a phase synchronization circuit (PLL circuit) 39 both of which will be described in detail.

The format generator 38 is a circuit which generates a preformat signal based on preformat information such as track addresses and sector addresses which are written beforehand in, for example, a ROM. Upon receipt of a formatting start instruction given by the control circuit 31, the format generator 38 delivers the generated preformat signal to the driver 39, in accordance with the binary signal (d).

Figure 11:
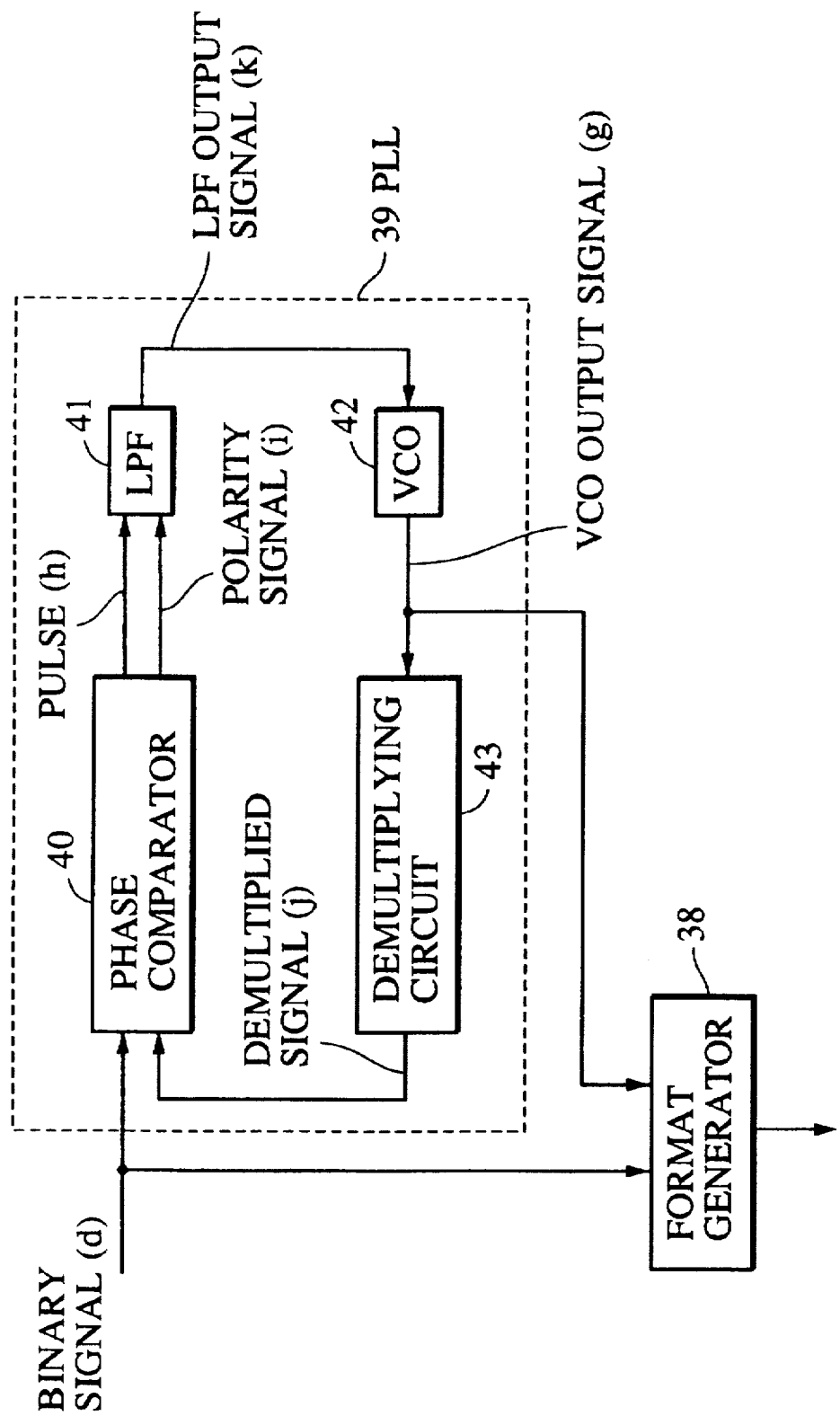
FIG. 11 is a block diagram showing the construction of a PLL circuit incorporated in the embodiment shown in FIG. 10.

Meanwhile, the PLL circuit 39 receives the binary signal (d) from the binary coding circuit 27, and operates to achieve synchronization between the binary signal (d) and the preformat signal which is obtained from the format generator 38. FIG. 11 shows the construction of the PLL circuit 39.

The PLL circuit 39 includes a phase comparator 40, a low-pass filter (LPF) 41, a voltage-controlled oscillator (VCO) 42 and a demultiplying circuit 43 each of which will be described in detail below.

The VCO 42 is a clock generator which generates a synchronizing signal, VCO output signal (g), for achieving the synchronization between the binary circuit (d) and the preformat signal. The oscillation frequency of the VCO varies in accordance with a control voltage which is supplied externally. More specifically, the VCO oscillates at its natural frequency fc when the control voltage supplied externally is "0". The oscillation frequency varies around the natural frequency in accordance with a change in the control voltage.

The demultiplying circuit 43 includes, for example, a counter, and demultiplies the output frequency of the VCO 42 to a value which equals to the value obtained by dividing the operation clock frequency of the format generator 38 by the rotation number of the disk, thereby producing a demultiplied signal (j) of a frequency that approximate the disk rotation frequency.

The phase comparator 40 has one input line which receives the demultiplied signal (j) from the demultiplying circuit 43 and the other input line which receives the binary signal (d) from the binary coding circuit 27, and, by comparing the phases of these two kinds of signals, produces a pulse (h) of a pulse width corresponding to the time difference between the rises of these signals, together with a polarity signal (i) indicative of which one of the phases of these two signals is advanced. The absolute value of the pulse (h) and the polarity indicated by the polarity signal (i), which are outputted from the phase comparator 40, are supplied to the LPF 44. The LPP 44 feeds only a low-frequency component of the pulse (h) back to the aforesaid VCO 42, as the output signal (k).

FIGS. 12(a)-12(f) illustrate the operation of the PLL circuit described above. More specifically, these figures show waveforms of the binary signal (d) at various components, as observed when a beam spot has been moved on a track across mirror sections 4a to 4c in accordance with rotation of the disk.

Figure 12:
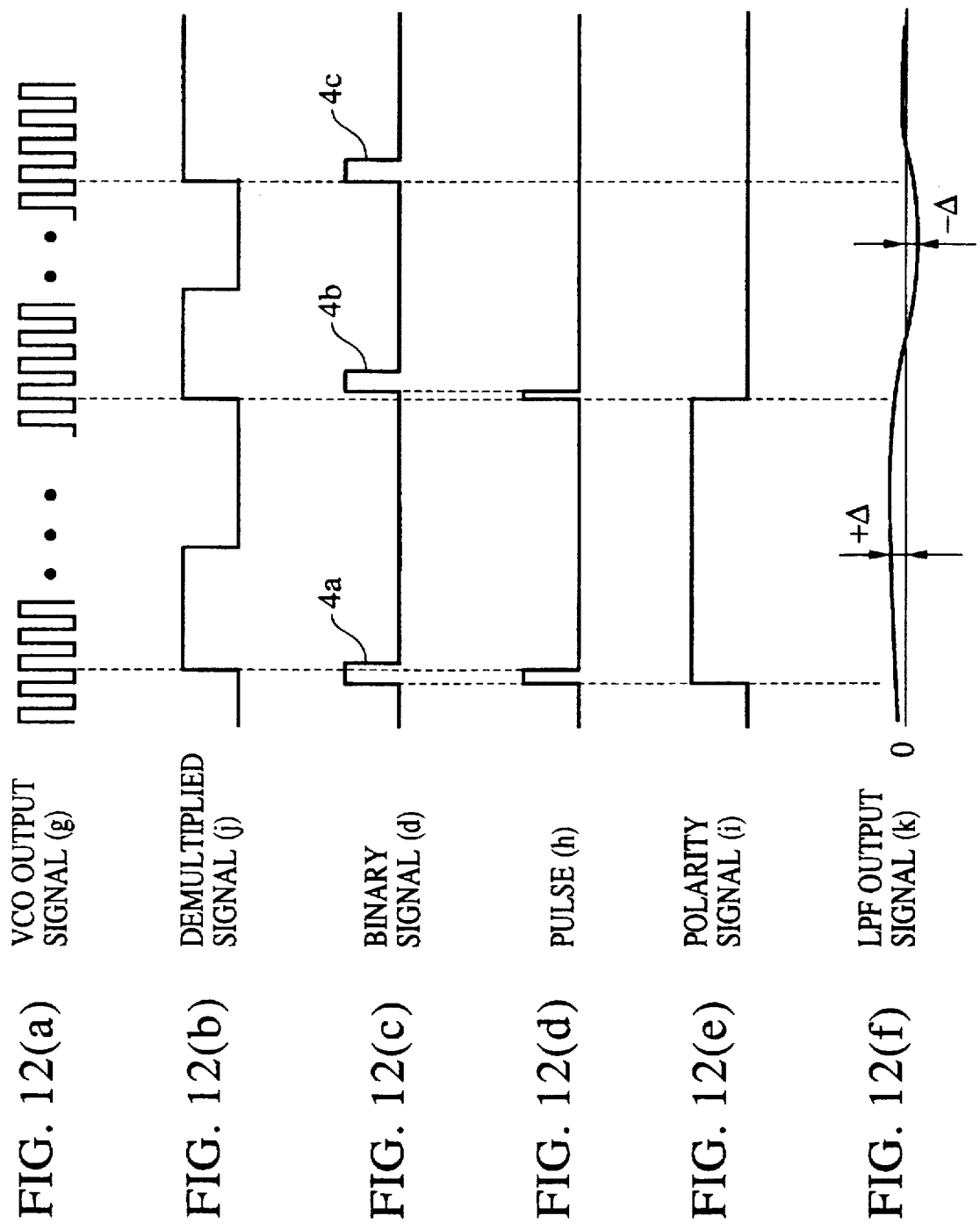
FIG. 12(a)–12(f) are waveform charts for explaining the operation of a PLL circuit 39 shown in FIG. 11.

When the beam spot crosses the mirror section 4a, the rising edge of the demultiplied signal (j) (shown in FIG. 12(b)) is delayed after or behind the rising edge of the binary signal (d) (shown in FIG. 12(c)), so that the phase comparator 40 produces a polarity signal (i) (shown in FIG. 12(e)) of high level and a pulse (h) (shown in FIG. 12 (d)) of a width corresponding to the amount of delay. As a result, the LPF 41 produces an output +Δ of positive polarity as its output signal (k) (shown in FIG. 12(f)). Consequently, the VCO increases its oscillation frequency by a small amount corresponding to +Δ.

The rise in the output frequency of the VCO causes a corresponding advance of the demultiplied signal (j) which is produced by the demultiplying circuit 43, so that, when the beam spot has reached the position of the mirror section 4b as a result of one full rotation of the disk, the timing of rising edge of the binary signal (d) is delayed slightly after the timing of the rising edge of the demultiplied signal (j).

The delay of the binary signal (d) behind the demultiplied signal (j) causes the phase comparator 40 to produce the polarity signal (i) of low level and the pulse (h) of a width corresponding to the amount of delay, whereby the LPF 41 produces an output signal (k) of −Δ. As a consequence, the oscillation frequency of the VCO 42 is slightly lowered by an amount corresponding to −Δ.

Thus, as a result of negative feedback of the phase difference between the binary signal (d) and the demultiplied signal (j), the phases of the binary signal (d) and the demultiplied signal (j) are synchronized and stabilized when the beam spot reaches the mirror section 4. The output signal (g) (shown in FIG. 12(a)) of the VCO obtained in this state is used as reference clock based on which the format generator 38 is driven, whereby the preformat signal produced by the format generator 38 is kept in synchronization with the binary signal (d).

Numeral 37 denotes a driver which drives the light source 22c based on the preformat signal generated by the format generator 38. Obviously, when the system is of a magnetic field modulation type, the magnetic head is driven by the driver 37. A reproduction system 36 demodulates and reproduces the signal which is obtained through a photo-electric conversion performed by the sensor 22d. The signal reproduced by the reproduction system is delivered to the control circuit 31.

The control circuit 31 used in this embodiment performs various functions such as a control of movement of the optical head 22 during the formatting, issue of a formatting start instruction, and verification of the recorded preformat signal based on the demodulated signal derived from the reproduction system 36.

The verification of the recorded preformat signal is to confirm: (1) whether the preformat signal has been recorded in conformity with the information recorded in the ROM mentioned before; and (2) whether the preformat signal is not recorded in the mirror section. The confirmation (1) can be conducted by a known technique based on the demodulated signal derived from the reproduction system 36, while the confirmation (2) can be executed based on the demodulation signal from the reproduction system 36 and the binary signal (d).

A description will now be given of the formatting operation of this optical information recording/reproducing apparatus.

When the disk 1 is mounted in the information recording/reproducing apparatus, the optical head 22 is moved to a position which corresponds to the innermost or outermost periphery of the track, by the operation of the control circuit 31. Whether the optical head is set to the outermost position or the innermost position is determined by the format of the recording to be performed on the disk. The description will proceed based on the assumption that the tracking is started from the outermost peripheral portion of the track.

In general, optical head 22 of the information recording/reproducing apparatus of the kind described is set to the outermost peripheral position based on the output from an optical head position sensor, or located at that position by means of a mechanical stopper which is located at that position. A spindle motor is started without delay after mounting the disk, and focusing control is commenced to focus the optical head 22 with respect to the rotating disk.

As stated before, the mirror section of the optical disk used in this embodiment of the information recording/ reproducing apparatus has a higher reflectivity than other portions, so that it is detectable even by the focusing servo control alone. It is therefore possible to start the operation of the PLL circuit 39, before the tracking servo control is put to effect.

The control circuit 31, first of all, moves the optical head to the outermost peripheral position and issues an instruction for starting focusing servo control. When the PLL circuit 39 has been brought into synchronization with the binary signal (d) which indicates detection of a mirror section, the control circuit 31 operates to start the tracking servo control, and delivers a formatting start instruction to the format generator 38 without delay.

Upon receipt of the formatting start instruction from the control circuit 31, the format generator 38 delivers, without delay, the preformat signal to the driver 37 in accordance with the mirror section detection signal. The driver 37 drives the light source (or a magnetic head in case of a magnetic field modulation recording) based on the preformat signal received from the format generator 38.

It is therefore possible to record the preformat signal in accordance with the detection of the mirror section, by controlling the driver 37 based on the clock output of the PLL circuit 39, i.e., the signal (g), and the binary signal (d). For instance, the preformat signal is recorded in such a manner that the leading end of a sector is on the trailing side of a mirror as viewed in the direction of rotation of the disk.

The thus recorded preformat signal is reproduced by the operation of the optical head 22. Namely, the photoelectrically converted signal from the sensor 22d is demodulated by the reproduction system 36 so as to be delivered to the control circuit 31.

Upon receipt of the demodulated signal, the control circuit 31 performs the aforesaid verification, i.e., confirmation as to whether the recorded preformat signal conforms with the information stored in the ROM and confirmation as to whether no part of the preformat signal has been recorded in the mirror section.

In the foregoing description, the PLL circuit 41 is started after the start of the focusing servo control. The operation, however, may be such that the tracking servo control is started without delay after the start of the focusing servo control, and the optical head 22 is held on a certain track until the operation of the PLL circuit is stabilized. The tracing is commenced after the PLL circuit 39 has been synchronized, thus commencing the formatting.

In the operation as described, the precision of the radial position on the disk at which the preformatting is commenced depends on the mechanical precision of the mechanism which locates the optical head at the outermost peripheral position. A higher precision of preformatting, however, is achievable by arranging such that the preformatting is commenced upon detection of a mark indicative of the outermost peripheral position, such as a mark distinguished by an optical constant, e.g., reflectivity, different from those of other portions.

The foregoing description is based on an assumption that the recording medium employed has only one mirror section appearing during one full rotation of the disk. The described information recording/reproducing apparatus, however, can be used in combination with a recording medium of the type which has a plurality of mirror sections in one full turn of the track. For instance, it is possible to use an optical information recording/reproducing apparatus in which a plurality of lands and grooves are formed in a single track so as to appear alternately in the direction of disk rotation, with a mirror section formed between each land and the adjacent groove, the mirror sections being spaced such that the mirror section detection signals are produced at a constant period. In such a case, the demultiplication factor of the demultiplication of the output from the VCO 42 performed by the demultiplying circuit 43 is determined by further dividing, by the number of mirrors appearing per rotation of the disk, the value which is obtained by dividing the clock frequency from VCO 42 by the number of rotations of the disk. The formatting is conducted in accordance with the synchronizing signals which are generated by the PLL circuit 39 while the polarity of the tracking error signal is switched each time the beam spot crosses the mirror section. In this case, the frequency of the binary signal (d) indicative of detection of mirror sections is increased. The pass-band of the LPF therefore may be raised correspondingly. This, however, does not cause any critical problem.

It is also possible to use a recording medium of the type in which, in order to maximize the storage capacity, an even number of sectors are provided, wherein selected sectors are provided with, or are devoid of, the mirror section, so that the medium as a whole has an odd number of mirrors. In such a case, however, the demultiplication factor of the demultiplication of the output from the VCO 42, performed by the demultiplying circuit 43, is determined to a value which is obtained by dividing, with the number of sectors appearing per rotation, the value which is determined by dividing the clock frequency from the VCO 42 by the number of rotations of the disk.

Figure 13:
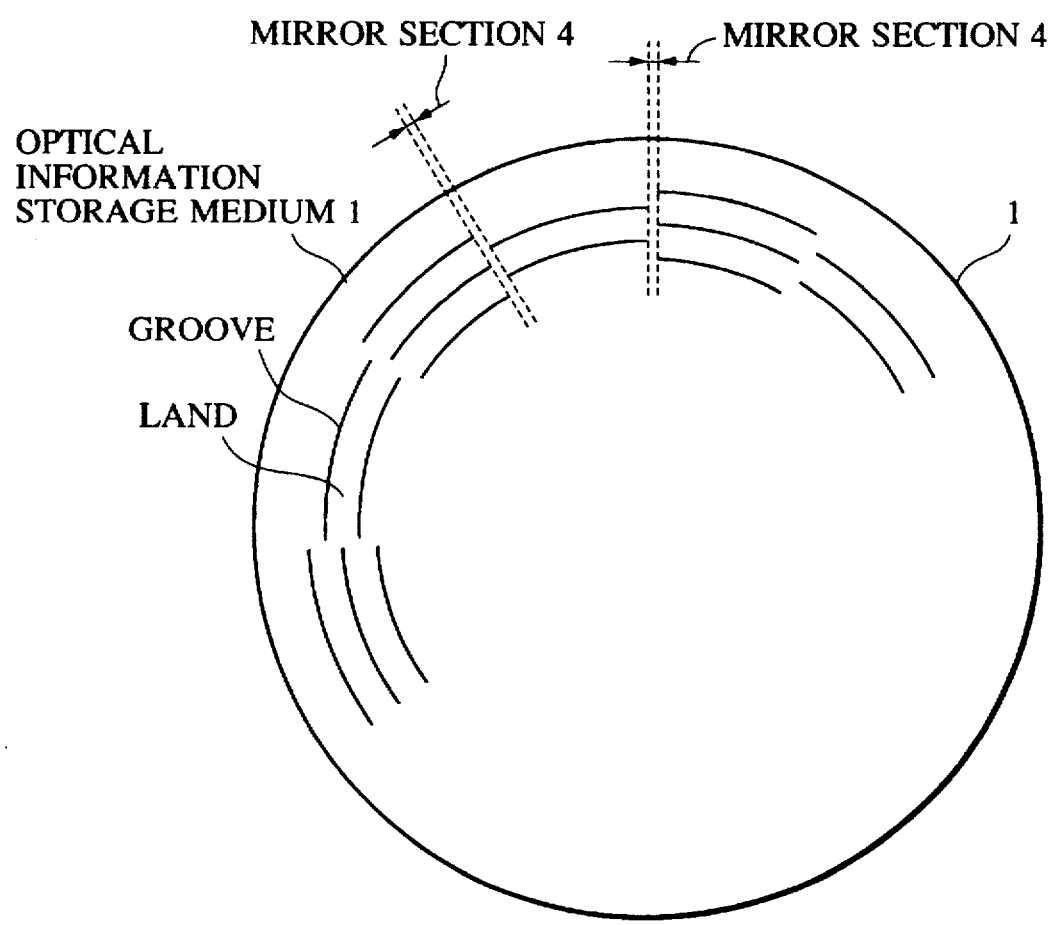
FIG. 13 is an illustration of an optical information recording medium in which a plurality of mirror portions are provided in a single track.

As will be understood from the foregoing description, it is possible to obtain a highly reliable optical information recording medium by recording preformat information on an optical information recording medium of the type shown in FIG. 4(a) or FIG. 13, by using the information recording/ reproducing apparatus of the described embodiment, thus realizing stable recording and/or reproduction of information. The optical information recording medium to be used in the information recording/reproducing apparatus of the described embodiment may be of WORM type or R/W type mentioned before. Furthermore, the information recording/ reproducing apparatus of the described embodiment allows the advantages of the aforesaid CAV or ZCAV technique to be fully enjoyed.

In order to met the demand for greater storage capacity of recording medium, a technique referred to as "super-resolution technique", which enables recording on an opto-magnetic disk made of a magnetic material with a recording density higher than the optical resolution of the reproducing light, as in Japanese Patent Laid-Open Nos. 6-124500, 3-93058 and 4-255946. The information recording/ reproducing apparatus of the present invention can employ an opto-magnetic disk and can magnetically record the preformat information in such a type of disk. Therefore, it is possible to form the preformat information by using the above-mentioned super-resolution technique. A brief description therefore will be given as to each of the proposed super-resolution techniques which have been proposed.

Figure 14A:
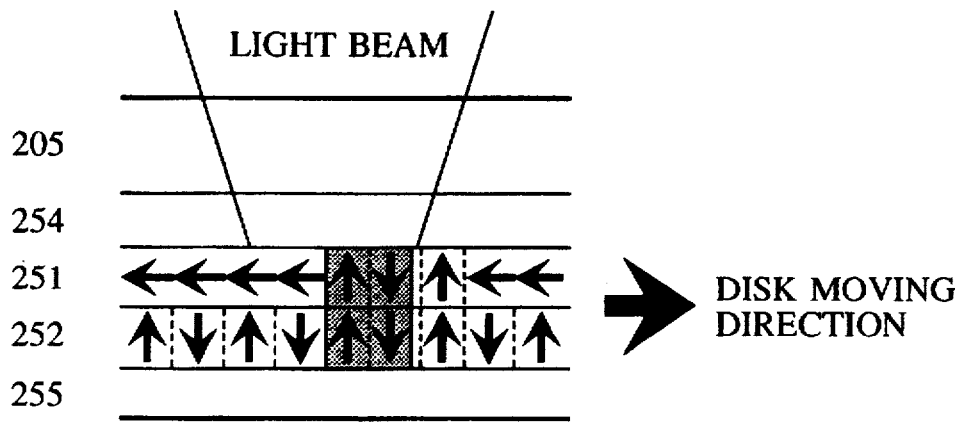
Figure 14B:
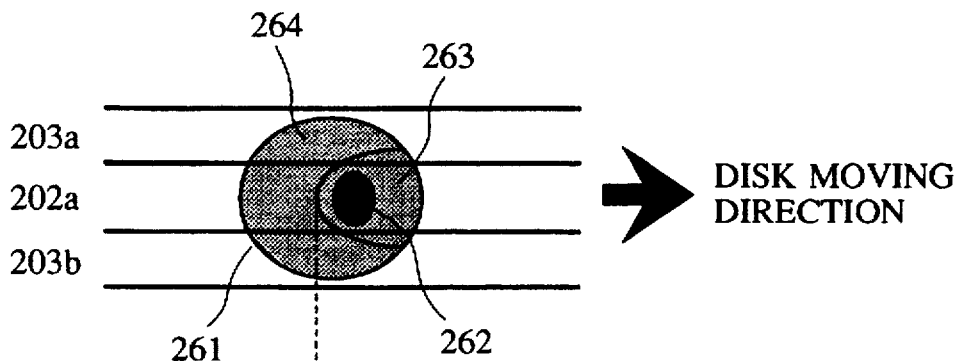
Figure 14C:
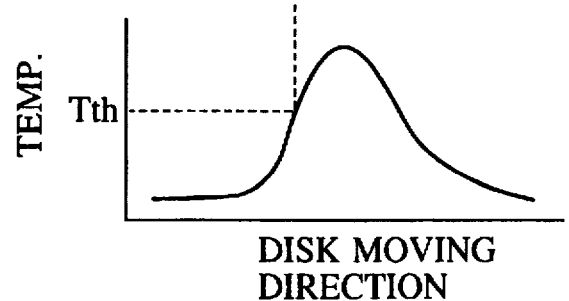

(1) Super-resolution technique disclosed in Japanese Patent Laid-Open No. 6-124500:

FIGS. 14(a) to 14(c) are illustrations of the super-resolution technique disclosed in Japanese Patent Laid-Open No. 6-124500. FIG. 14(a) is a schematic sectional view of an opto-magnetic disk in a state in which a recording surface of the disk is irradiated with a reproducing light. FIG. 14(b) is a schematic illustration of a part of the recording surface of the disk showing grooves 203a and 203b, and land 202a. FIG. 14(c) is an illustration of the temperature distribution along the center of a track in the recording surface shown in FIG. 14(b).

Referring to these Figures, an opto-magnetic disk has a substrate 205 formed from glass, polycarbonate or the like, and a laminate structure formed on the substrate 205. The laminate structure includes, starting with the lowermost one contacting the substrate 205, an interference layer 254, a reproduction layer 251 as the first magnetic layer, a memory layer 252 as a second magnetic layer, and a protective layer 255.

The interference layer 254 is intended to enhance Kerr effect, while the protective layer 255 serves to protect the magnetic layers constituting the reproduction layer 251 and the memory layer 252. Arrows appearing in the reproduction layer 251 and the memory layer 252 indicate the directions of magnetization of a sub-lattice of ferrous elements in the respective layers. The memory layer 252 is a layer having a large vertical magnetic anisotropy and is formed from, for example, TbFeCo or DyFeCo. Information to be recorded forms magnetic domains depending on whether the magnetization of the memory layer 252 is upward or downward, so as to be held in this layer. The reproduction layer 251 is formed from a material which exhibits a small vertical magnetic anisotropy of saturated magnetization Ms and having a structure in which magnetization of a sub-lattice of rare earth elements is dominant. More specifically, the reproduction layer 251 is made of a material which is an in-plane magnetized film at room temperature but decreases saturated magnetization Ms in accordance with a temperature rise so as to become a vertically magnetized film when a threshold temperature Tth is exceeded.

Application of information reproducing light to this opto-magnetic disk from the same side as the substrate 250 develops a temperature gradient as shown in FIG. 14(c) at the center of the track. When viewed from the same side as the substrate 205, an isotherm of the threshold temperature Tth should exist in the spot of the beam, as shown in FIG. 14(b). In the region below the threshold temperature Tth, the reproduction layer 251 takes the form of the in-plane magnetized film so as not to contribute to enhancement of Kerr effect, but forms a front mask 264 which masks the recording magnetic domains held by the memory layer 252 to make them invisible.

Meanwhile, in the region where the temperature exceeds the threshold temperature Tth, the reproduction layer 251 becomes a vertically magnetized film, and as a result of an exchange coupling with the memory layer 252, the direction of magnetization of the ferrous element sub-lattice aligns with the recorded information. As a consequence, the recorded magnetic domain in the memory layer 252 is transferred only within the area of an aperture 263 which is smaller than the beam spot 261, whereby super-resolution of recording mark 262 is realized.

Figure 15A:
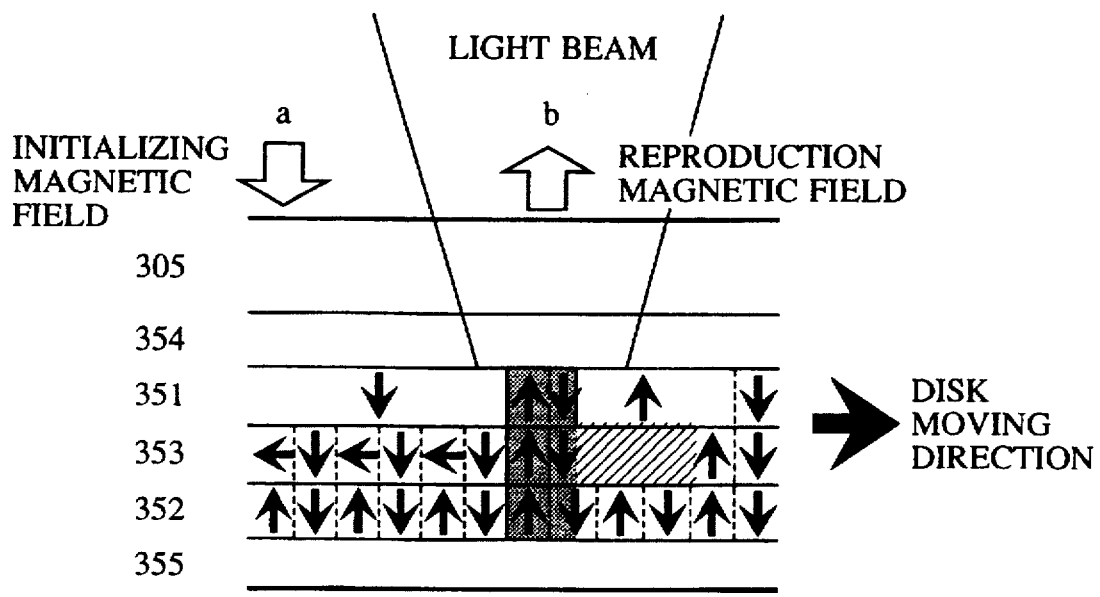
Figure 15B:
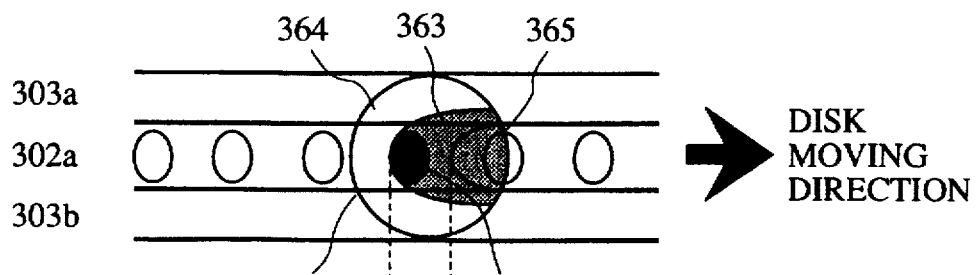
Figure 15C:
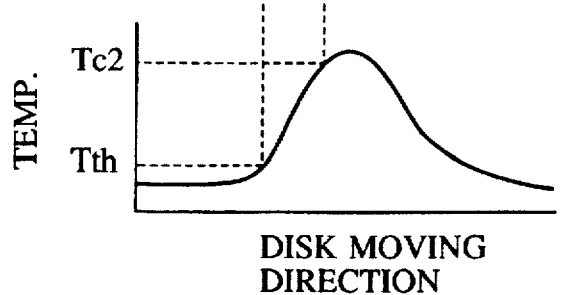

(2) Super-resolution technique disclosed in Japanese Patent Laid-Open Nos. 3-93058 and 4-255946:

FIGS. 15(a) to 15(c) are illustrations of the super-resolution technique disclosed in Japanese Patent Laid-Open Nos. 3-93058 and 4-255946. FIG. 15(a) is a schematic sectional view of an opto-magnetic disk in a state in which a recording surface of the disk is irradiated with a reproducing light. FIG. 15(b) is a schematic illustration of a part of the recording surface of the disk showing grooves 303a and 303b, and land 302a. FIG. 15(c) is an illustration of the temperature distribution along the center of a track in the recording surface shown in FIG. 15(b).

The construction of this opto-magnetic disk is the same as that shown in FIGS. 14(a) to 14(c), except that an intermediate layer 353 as a third magnetic layer is interposed between the reproduction layer denoted by 351 and the memory layer denoted by 352. Layers 351, 353 and 352 are disposed on interference layer 354 which, in turn, is disposed on substrate 305. Protective layer 355 is disposed on memory layer 352.

Prior to reproduction of recorded information, an initializing magnetic field is applied as indicated by an arrow (a), so as to align the direction of magnetization of the reproduction layer 351, thereby masking the magnetic domain information held in the memory layer 352. A temperature distribution is caused in the disk as a result of application of a beam spot 361. In a low-temperature region below a temperature Tth, the reproduction layer 351 maintains the initial state so as to form a front mask 364, while, in a high-temperature region above the Curie point Tc2 of the intermediate layer 353, the reproduction layer 351 is forcibly oriented in the direction of the reproduction magnetic field (arrow (b)) so as to form a rear mask 365, so that the magnetic domain information held in the memory layer 352 is transferred only in the region of an intermediate temperature region 363. Thus, the effective size of the reproducing beam spot is reduced so as to make it possible to reproduce a recorded mark 362 which otherwise cannot be reproduced due to the diffraction limit of the light, whereby the line density is increased.

In these known super-resolution techniques, attempt is also made to enhance the track density, as well as the line recording density, because the front mask 364 formed in the low temperature region spreads also towards adjacent tracks.

The information recording/reproducing apparatus of the present invention, when it employs the above-described super-resolution technique, makes it possible to record the preformat information in the form of ultrafine marks, thus enhancing the recording density in the whole disk. Furthermore, the track density also can be enhanced. It is therefore possible to obtain a disk having a further increased storage capacity.

Sixth Embodiment

This embodiment is a master disk exposure apparatus for use in the production of a master disk from which a plurality of substrates of disks as the optical information recording medium of the present invention are copied.

Figure 16:
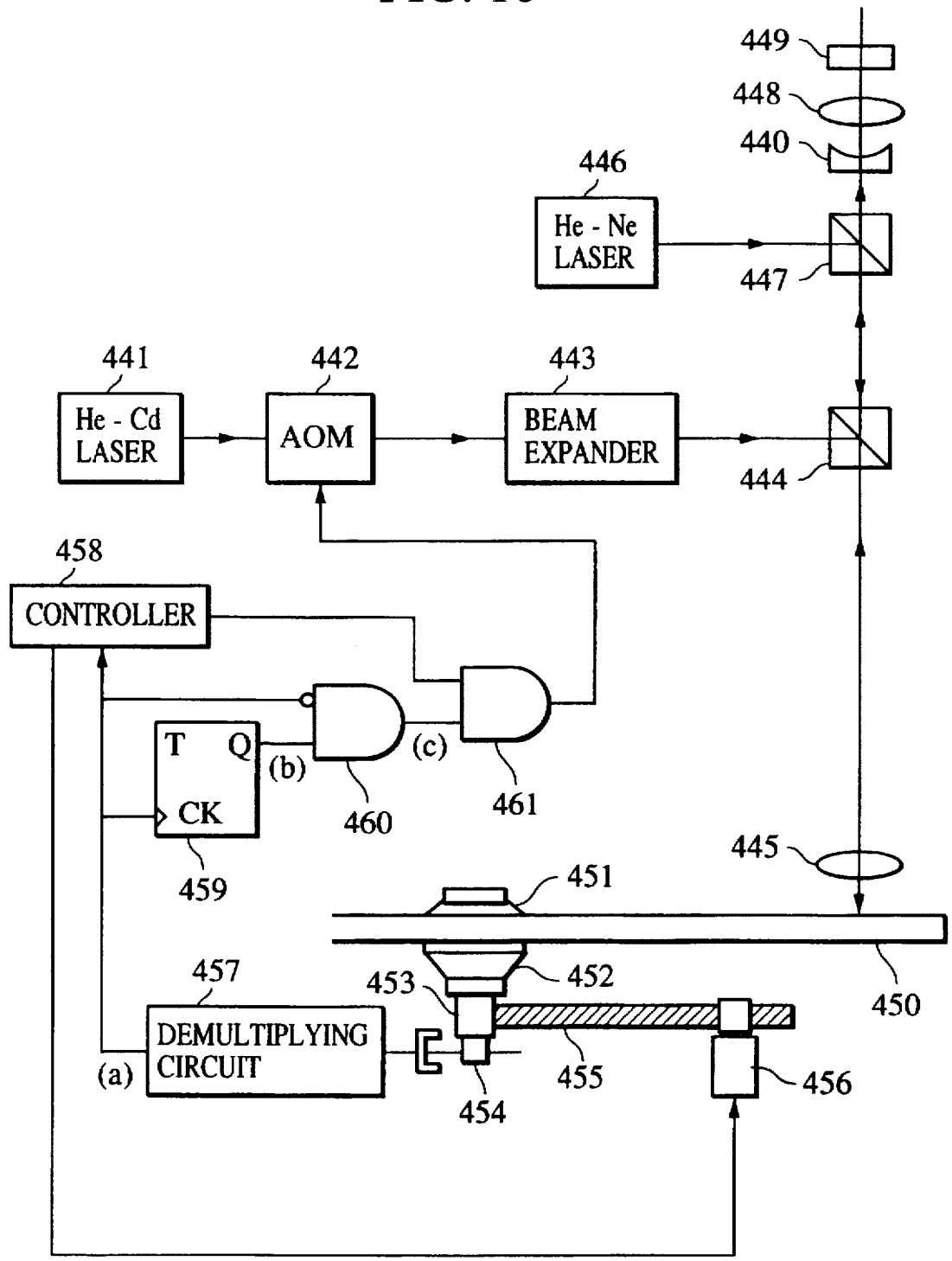
FIG. 16 is a block diagram schematically showing the construction of an optical disk master exposure apparatus as a sixth embodiment of the present invention.

FIG. 16 is a block diagram schematically showing the construction of the master disk exposure apparatus as the sixth embodiment.

Referring to FIG. 16, numeral 450 denotes a disk-type glass master disk on which a photoresist as a photosensitive material has been applied. The master disk 450 is fixed to a turn table 452 by means of a disk retainer 451. The turn table 452 is driven to rotate together with the glass master disk 450 fixed thereto, by means of a spindle motor 453. The spindle motor 453, turn table 452 and the disk retainer 451 in combination provide a master disk driving mechanism for rotatingly driving the glass master disk 450. A rotation control circuit (not shown) controls the operation of the spindle motor 453 in accordance with an output from a rotary encoder 454 provided on the spindle motor 453, so as to rotate the turn table 452 at a constant speed of rotation.

The above-mentioned driving mechanism also has a traverse feed screw 455 and a traverse feed motor 456 for driving the feed screw 455. The traverse feed motor 456 and the traverse feed screw 455 in cooperation provide a traverse feed mechanism which causes a relative movement between the glass master disk 450 and a laser beam spot which is applied to the photoresist on the master disk to form grooves on the disk, such that the laser beam spot moves in a radial direction of the glass master disk 450. Although in the illustrated embodiment the traverse feed mechanism having the traverse feed screw 455 and the traverse feed motor 456 is used as the mechanism for effecting the traversal of the driving mechanism, this traverse feed mechanism is intended to effect a relative movement between the glass master disk 450 and the laser spot beam in the radial direction of the disk and, hence, may be substituted by a mechanism which causes the optical system described below, i.e., an exposure system for irradiating the glass master disk 50 with the laser beam so as to expose the photoresist on the glass master disk 450.

Numeral 441 denotes a light source for emitting a light beams for forming a track guide groove in the recording surface of the glass master disk 450. In this embodiment, an He—Cd laser is used as the light source. An acousto-optical modulator (AOM) 442, a beam expander 443 and a half mirror 444 are arranged in the mentioned order ahead of the He—Cd laser 441 as viewed in the direction of running of the beam from the He—Cd laser 441. An objective lens 445 is disposed ahead of the half mirror 444 as viewed in the direction of running of the beam reflected by the half mirror 444. The AOM 442 is intended to modulate intensity of the laser light to be emitted from the He—Cd laser 441 in accordance with a signal which is supplied externally. In this embodiment, a binary modulation of the laser beam intensity is effected by the AOM 442 so as to form grooves at desired positions on the glass master disk 450.

In the optical system as described above, the beam emitted from the He—Cd laser 441 is intensity-modulated by the AOM 442 and enters the beam expander 443 which increases the beam diameter. The beam is then reflected by the half mirror 444 and is then focused on the glass master disk 450 through the objective lens 445. The position of the objective lens 445 is controlled by a focusing control system using a focusing control optical system described below, such that the laser beam from the He—Cd laser is constantly focused on the glass master disk 450.

The focusing control optical system employs an He—Ne laser 446 as the light source and a half mirror 447 disposed ahead of the He—Ne laser 446 as viewed in the direction of running of the beam. The aforesaid half mirror 444 and the objective lens 445 are arranged ahead of the half mirror 447 as viewed in the direction of running of the beam reflected by the half mirror 447, so that the beam from the He—Ne laser 446 is focused on the glass master disk 450 through these elements. The beam reflected by the glass master disk 450 passes through the objective lens 445, half mirror 444 and the half mirror 447, in the mentioned order. A cylindrical lens 440, a condenser lens 448 and a sensor 449 are arranged in the mentioned order ahead of the half mirror 447 as viewed from the direction of running of the reflected beam. The sensor 449 has a light-receiving surface which is divided into four sections and performs detection of a focus error signal in accordance with an astigmatism method which is known per se, based on the beam focused on the light receiving surface through the cylindrical lens 440. A focus servo control system (not shown) controls the position of the objective lens 445, based on the focus error signal output from the sensor 449, whereby the laser beam from the He—Cd laser 441 is always held in an in-focus state on the glass master disk 450.

The circuit for generating the external signal to be inputted to the AOM 442, i.e., the circuit for determining the period of modulation of the AOM 442, includes the aforementioned rotary encoder 454 and components including demultiplying circuit 457, toggle flip-flop 459, and gate circuits 460, 461, each described below.

Figure 17:
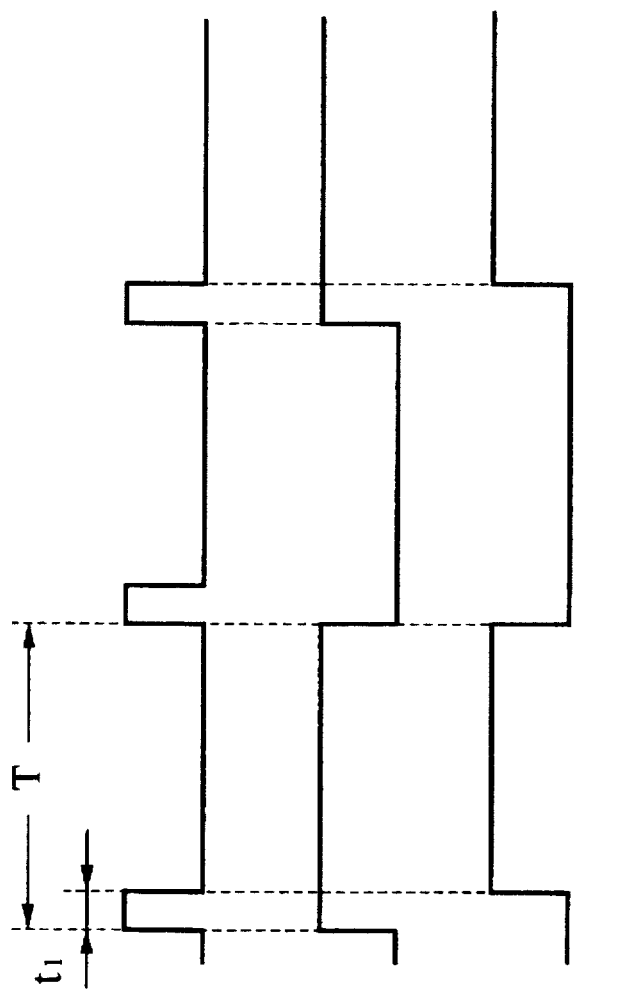
FIGS. 17(a)–17(c) are waveform charts showing waveforms of signals outputted from a demultiplying circuit 457, a toggle flip-flop 459 and a gate circuit 460, which are incorporated in the optical disk master exposure apparatus of FIG. 16, illustrative of the period of modulation of an acousto-optical modulator (AOM) 442 incorporated in the apparatus.

The demultiplying circuit 457 has a counter and other components and is adapted to generate a pulse signal (a) of a pulse width $t_1$ at a predetermined period T, as shown in FIGS. 17(a)–17(c), by counting the number of output pulses from the rotary encoder 454. In this embodiment, the period T equals to the period of rotation of the glass master disk 450, so that the pulse width $t_1$ is given by the following formula:

$$t_1 = (1 \times 10^{-6}) V \cdot (100 \times 10^{-6}) V \quad [S]$$

where V represents the linear velocity of the point on the glass master disk where the laser beam spot is applied.

The output from the demultiplying circuit 457 is input to the controller 458 and is used as a clock signal for the toggle flip-flop circuit 459. The output from the demultiplying circuit 457 is input also to one of input terminals of the gate circuit 460 after inversion.

Using the pulse signal (a) from the demultiplying circuit 457 as the clock, as shown in FIG. 17(a), the toggle flip-flop 459 generates an output signal (b), as shown in FIG. 17(b), of a period which is twice as long the period of rotation of the glass master disk 450, such that the level of the signal (b) is changed from "1" to "0" in one rotation of the disk and from "0" to "1" in the next rotation of the disk, as shown in FIG. 17(b).

The gate circuit 460 has two input lines one of which receives the pulse signal (a) from the demultiplying circuit 457 after inversion, while the other receives the output signal (b) from the toggle flip-flop 459. The gate circuit 460, upon receipt of these signals, produces a signal (c) as the logical product of these signals, as shown in FIG. 17(c). The output signal (c) of this gate circuit 60 is used as the above-mentioned external input signal to be supplied to the AOM 442. Thus, the intensity of the laser beam is modulated at the same period as the output signal (c) from the gate circuit 460.

In this embodiment, as will be seen from FIGS. 17(a)–17(c), the duration of the level "1" of the output signal (c) is shorter than that of the output signal (b) by an amount corresponding to the pulse width $t_1$ of the pulse signal (a), while the duration of the "0" level of the signal (c) is longer than that of the signal (b) by an amount which corresponds to the pulse width $t_1$ of the pulse signal (a). Therefore, on condition that the period of the output signal (c) is twice as long the period of rotation of the glass master disk 450, it is possible to obtain a groove such as that of the optical information recording medium shown in FIGS. 4(a) and 4(b), by forming the groove with the laser beam while the level of the output signal (c) is "1".

The gate circuit 461 is provided for the purpose of controlling the output of the signal (c) from the above-mentioned gate circuit 460 to the AOM 442. The gate circuit 461 has two input lines. One line receives the output (c) from the gate circuit 460, while the other receives a signal from the controller 458. The gate circuit 461 produces logical product of these signals and delivers the logical product as the external input signal to the AOM 442. Thus, the gate circuit 461 controls the delivery of the output signal (c) of the gate circuit 460 to the AOM 442, in accordance with the signal from the controller 458.

The controller 458 conducts overall control of the apparatus, in synchronization with the pulse signal (a) output from the demultiplying circuit 457. For instance, it performs a control to realize a constant velocity of traverse feed performed by the traverse feed motor 456, and conducts on-off control of the gate circuit 461 thereby controlling the supply of the output signal (c) from the gate circuit 460 to the AOM 442. In normal operation, the gate of the gate circuit 461 is turned on to commence the modulation of the laser beam intensity performed by the AOM 442, thus starting forming of the groove in the glass master disk 450, only when the constant traverse velocity has been achieved after start-up of the traverse feed motor 456.

The master disk exposure apparatus having the described construction operates in a manner which will be described hereinunder.

In operation, the spindle motor 453 is started first, so that the turn table 452 carrying the glass master disk 450 fixed thereto starts to rotate at a predetermined speed. As a result, the demultiplying circuit 457 produces the pulse signal (a) corresponding to the period of rotation of the glass master disk, based on the output of the rotary encoder 454. When the rotation of the turn table has become steady, the objective lens 445 starts to operate, thus commencing the focus servo control.

Upon receipt of the pulse signal (a), the toggle flip-flop 459 produces the output signal (b) of a frequency which is half that of the rotation frequency of the glass master disk 450, based on the received pulse signal (a), and the gate signal 460 outputs an output signal (c) which is input as the external input signal to the AOM 442. In this state, the level of the signal supplied by the controller 458 to the gate circuit 461 is "0", so that no signal is delivered by the gate circuit 461 to the AOM 442. Consequently, no mark or groove is formed in the master disk.

Then, the traverse feed motor 456 starts to operate so as to commence traverse feed. When a constant traverse feed velocity is obtained, the gate of the gate circuit 461 is turned on, so that the output signal (c) from the gate circuit 460 is delivered to the AOM 442 through the gate circuit 461.

The AOM 442 then effects intensity modulation of the laser beam to be emitted from the He—Cd laser 441, based on the output signal (c) supplied thereto. As a consequence, groove is formed in accordance with the output signal (c), whereby a groove such as that in the optical information recording medium shown in FIGS. 4(a) and 4(b) is obtained on the glass master disk 450.

Thus, the groove is formed in the glass master disk 450 by the laser beam spot, the intensity of which is modulated in accordance with the output signal (c), while the beam spot is continuously moved in a radial direction of the disk at a constant velocity. By forming optical disks employing this glass master disk 450 as the master, it is possible to obtain the optical information recording medium shown in FIGS. 4(a) and 4(b).

In the master disk exposure apparatus of this embodiment, the circumferential length of the mirror portion 4 of the medium shown in FIGS. 4(a) and 4(b) is determined by the pulse width $t_1$ of the pulse signal (a) shown in FIG. 17(a). Preferably, the circumferential length of the mirror section 4 is determined to range from 2 μm to 200 μm when measured on the master disk.

In the recording or reproduction of information in or from the optical information recording medium of the type shown in FIGS. 4(a) and 4(b), mirror section 4 is detected and the signal indicative of the detection of the mirror section 4 is used as a trigger signal for triggering the switching of polarity of the tracking error signal. It is therefore necessary that the circumferential length of the mirror section 4 is not so large as to cause a risk of bringing the tracking servo out of control but large enough to accommodating the spot of the pickup beam so as not to allow the spot to enter grooves adjacent to the mirror section 4. This is the reason why the circumferential length of the mirror section 4 is selected to range from 2 μm to 200 μm on the glass a master disk.

Seventh Embodiment

Figure 18:
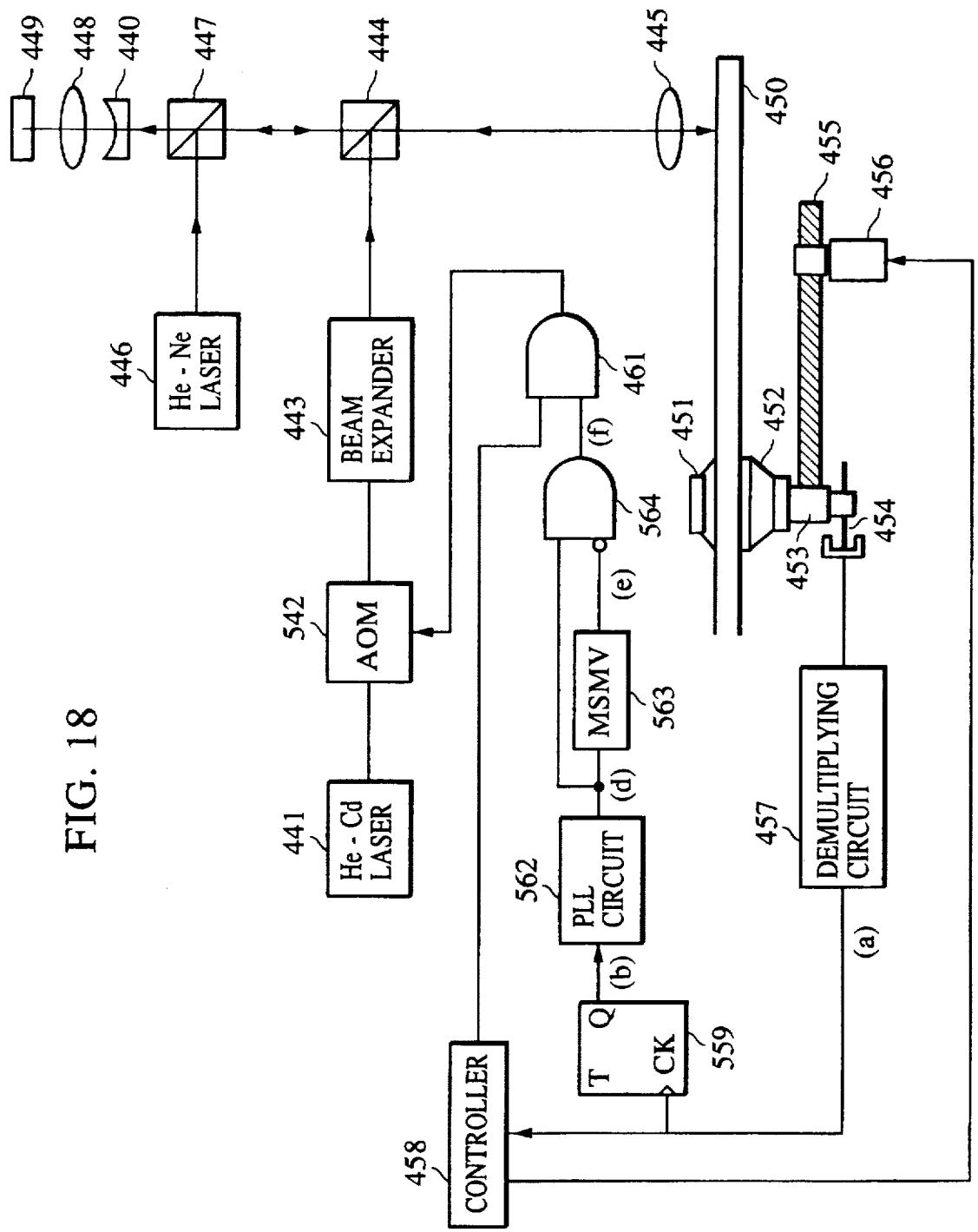
FIG. 18 is a block diagram schematically showing the construction of an optical disk master exposure apparatus as a seventh embodiment of the present invention.

FIG. 18 is a block diagram schematically showing the construction of a master disk exposure apparatus as the seventh embodiment of the present invention.

The apparatus of the seventh embodiment is similar to the exposure apparatus of the sixth embodiment, except the construction of the circuit which produces the external input signal to be delivered to the AOM denoted by 542 based on the signal output from the toggle flip-flop denoted by 559. More specifically, the seventh embodiment employs, in place of the gate circuit 460 shown in FIG. 16, a PLL (phase-locked loop) circuit 562, a monostable multivibrator (MSMV) 563 and a gate circuit 564. In FIG. 18, the same reference numerals as those used in the description of the sixth embodiment are used to denote components or parts which are the same or correspond to those of the sixth embodiment, and detailed description of such components or parts is omitted.

The PLL circuit 562 has an internal oscillator and produces a signal of a desired frequency in synchronization with an external clock signal. In this embodiment, the output from the toggle flip-flop 559 (shown in FIG. 19(b)) is used as the input signal to be inputted to the PLL circuit 562. The frequency of the internal oscillator is set to be (2n−1) times (n being a natural number) as high as the input signal which is the output from the toggle flip-flop 559. The PLL circuit 562 in synchronized state produces an output signal (d) of a waveform shown in FIG. 19(c). It will be seen that this output signal is synchronized with the rotation of the glass master disk 450 and has a frequency which is (2n−1)/2 times as high the rotation frequency of the glass master disk 450. The output signal (d) from the PLL circuit 562 is used as a trigger signal for triggering the operation of the monostable multivibrator 563 and is supplied to one of two input lines of the gate circuit 564.

The monostable multivibrator 563, by being triggered by the output signal (d) from the PLL circuit 562, produces a pulse signal (e) of a pulse width $t_2$ as shown in FIG. 19(d). The output from the monostable multivibrator 563 is supplied to the other of the input lines of the gate circuit 564. The monostable multivibrator 563 is intended to trigger the signal (d) so as to generate the signal (e) of the pulse width $t_2$, and hence, may be substituted by a circuit having an equivalent function, e.g., a counter circuit.

The gate circuit 564, upon receipt of the output signal (d) from the PLL circuit 562 at one input line thereof and the pulse signal (e) from the monostable multivibrator 563 after inversion at its other input, produces an output signal (f) which is the logical product of these received signals and which has a waveform as shown in FIG. 19(e). The output signal (f) of the gate circuit 564 is supplied as the external input signal to the AOM 542, so that the intensity of the laser beam is modulated at the period of this output signal (f). In this embodiment, as will be seen from FIG. 19(e), the duration of the "1" level of the output signal (f) is shorter than that of the output signal (d) by an amount which equals the pulse width $t_2$ of the pulse signal (a) (shown in FIG. 19(a)), and the duration of the "0" level of the output signal (f) is longer than that of the output signal (d) by an amount which equals to the pulse width $t_2$ of the pulse signal (a).

In this embodiment, the formation of the groove by the laser beam is conducted when the level of the output signal (e) is "1". The described master disk exposure apparatus therefore can form mirror sections as done by the master disk exposure apparatus of the sixth embodiment, when the pulse width $t_2$ of the pulse signal (e) produced by the monostable multivibrator 563 is determined to meet the following condition:

$$t_2 = (1 \times 10^{-6})/V - (100 \times 10^{-6})/V \quad [5]$$

where V represents the linear velocity of the point on the glass master disk where the laser beam spot is applied.

In this case, a plurality of circumferentially spaced mirror sections are formed such that they are aligned in the radial direction, as shown in FIG. 7 or FIG. 13.

In the master disk exposure apparatus of the present invention, the circumferential length of the mirror section is determined by the pulse width $t_2$ of the pulse signal (e) shown in FIG. 19. For the same reason as that stated in connection with the sixth embodiment, the circumferential length of the mirror section is preferably determined to range from 2 μm to 200 μm when measured on the master disk.

In the master disk exposure apparatus of the seventh embodiment as described, the frequency of the internal oscillator of the PLL circuit 562 is set to a value which is (2n−1) (n being a natural number) times as high the frequency of the input signal which is the output signal from the toggle flip-flop circuit 459. When the natural number n is set to be 1 (n=1), the operation of the apparatus is exactly the same as that would be performed when the PLL circuit 562 is omitted, i.e., when the input and the output of the PLL circuit are short-circuited. In such a case, the master disk as the product is exactly the same as that fabricated by the master disk exposure apparatus of the sixth embodiment.

The master disk exposure apparatus of the seventh embodiment can form a mirror section in each of sectors, when the number of the sectors in one turn along the disk is set to be (2n−1) while the frequency of the internal oscillator of the PLL circuit 562 is set to be equal to the above-mentioned number of sectors.

The master disk exposure apparatuses of the sixth and seventh embodiments as described are characterized in that the period of modulation of intensity of the laser beam effected in the AOM 442 is determined such that the period in which the laser beam is applied is shorter than the period in which the laser beam is not applied, during one full rotation of the glass master disk. More specifically, the period F of modulation of the laser beam intensity is determined to meet the following condition:

$$F = 2T/(2n-1)$$

(n being a natural number, T being the period of rotation of the glass master disk). Thus, the period in which the laser beam is applied is set to be below F/2, thus making it possible to form the mirror sections.

The sixth and seventh embodiments employ different constructions of the circuit for determining the period of modulation to be performed by the AOM 442 or AOM 542, respectively. The described constructions, however, are only illustrative and any other suitable circuit may be employed, provided that such circuit enables the period of intensity modulation of the laser beam to be synchronized with the rotation of the glass master disk in such a manner that the period in which the laser beam is applied is shorter than the period in which the laser beam is not applied in one full rotation of the disk. The optical information recording medium to be produced by the use of the master disk fabricated by the exposure apparatus as described may be of the ROM, WOROM, or R/W type, as mentioned before. Furthermore, advantages of the aforesaid CAV and ZCAV techniques are fully realized, when they are combined with the master disk exposure apparatus of the described embodiments. The individual components shown in the outline or designated by blocks in the foregoing drawings are all well known in the art and their specific construction and operation are not critical to the operation or best mode for carrying out the invention.

While the present invention has been described above with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A disk-type optical information recording medium comprising:

a plurality of tracks, each of said plurality of tracks comprising a land and a groove; and a mirror section which divides each land and each groove in a circumferential direction of the medium, a terminal end of the groove aligning with a leading end of the land across said mirror section in the circumferential direction of the medium.

2. A disk-type optical information recording medium according to claim 1, wherein a plurality of said mirror sections are formed at intervals in the circumferential direction of the medium.

3. A disk-type optical information recording medium according to claim 1, wherein said mirror section extends in a radial direction to divide each of said plurality of tracks.

4. A disk-type optical information recording medium according to claim 1, wherein each of said plurality of tracks has an odd number of said mirror sections.

5. A disk-type optical information recording medium according to claim 1, wherein each of said plurality of tracks has a plurality of sectors and said mirror section is provided in a part of a header portion of each of the sectors.

6. A disk-type optical information recording medium according to claim 1, wherein each of said plurality of tracks has a plurality of sectors and said mirror section is provided between adjacent sectors.

7. An optical information recording/reproducing apparatus for executing at least one of recording of information in, and reproduction of information from, a disk-type optical information medium having a plurality of tracks, each of the plurality of tracks including a land or a groove arranged on the disk such that a terminal end of the groove aligns with a leading end of the land across a mirror section in a circumferential direction of the medium, said apparatus comprising:

an optical head for irradiating the track on the recording medium with a light beam;

a tracking error signal generating circuit for generating a tracking error signal based on an output from said optical head;

a mirror section detecting circuit for producing a mirror section detection signal upon detection of said mirror section;

a polarity change-over device for switching polarity of said tracking error signal in response to the mirror section detection signal; and a servo circuit for effecting a tracking servo control of the light beam from said optical head based on the tracking error signal of the polarity switched by said polarity change-over device.

8. An apparatus according to claim 7, wherein said mirror section detecting circuit comprises:

a sum signal generating circuit for generating a sum signal from an output of said optical head;

a peak hold circuit for holding a peak level of the sum signal;

a DC level generating circuit for generating a predetermined DC level based on the peak level held by said peak hold circuit;

a binary signal generating circuit for generating a binary signal by comparing the sum signal and the DC level; and a toggle flip-flop for generating, based on the binary signal, a control signal for controlling said polarity change-over device.

9. An apparatus according to claim 7, further comprising:

a preformat signal generating circuit for generating a preformat signal synchronized with a phase of the mirror section detection signal and for delivering the preformat signal in accordance with the mirror section detection signal, wherein the preformat signal is recorded on the optical information recording medium by said optical head.

10. An apparatus according to claim 9, wherein said preformat signal generating means comprises:

an oscillator for generating a reference clock of a frequency which varies according to a level of a control voltage supplied thereto;

a demultiplying circuit for demultiplying an output of said oscillator with a predetermined demultiplication factor;

a phase comparator having a first input line for receiving an output signal from said demultiplying circuit and a second input line for receiving the mirror section detection signal, said phase comparator comparing phases of the output signal of said demultiplying circuit and the mirror section detection signal, and feeding a result of the comparison as the control voltage back to said oscillator; and a preformat signal generator for generating a preformat signal by using the reference clock outputted from said oscillator as an operation clock, and for delivering the generated preformat signal in accordance with the mirror section detection signal.

11. An apparatus according to claim 10, wherein the demultiplication factor used for the demultiplication performed by said demultiplying circuit is given by: (frequency of operation clock of said format signal generator)/(rotation number of the medium)/(number of sectors per track).

12. An apparatus according to claim 10, wherein the demultiplication factor used for the demultiplication performed by said demultiplying circuit is given by: (frequency of operation clock of said format signal generator)/(rotation number of said medium)/(number of mirror sections per track).

13. An optical information recording/reproducing method for executing at least one of recording of information in, and reproduction of information from a disk-type optical information medium having a plurality of tracks, each of the plurality of tracks including a land or a groove arranged on the disk such that a terminal end of the groove aligns with a leading end of the land across a mirror section in a circumferential direction of the medium, the method comprising the steps of:

irradiating a track on the medium with a light beam;

generating a tracking error signal based on the light of the beam reflected by the medium;

detecting the mirror section;

switching a polarity of a tracking error signal in accordance with the result of said detecting step; and performing tracking control of the light beam based on the tracking signal of the polarity switched in said switching step.

14. A master disk exposure apparatus for use in fabricating a master disk of an optical information recording medium comprising a plurality of tracks, each of said plurality of tracks comprising at least a land or a groove, and a mirror section which divides each land and each groove in a circumferential direction of the medium, a terminal end of the groove aligning with a leading end of the land across said mirror section in the circumferential direction of the medium, a apparatus comprising:

a driving mechanism for rotatingly driving a glass master disk with a photosensitive material applied thereto;

an exposure system for irradiating the glass master disk with a laser beam to expose the photosensitive material;

a traverse feed mechanism for moving at least one of said exposure system and said driving mechanism in such a manner as to cause a radial movement of a spot of the laser beam relative to the glass master disk;

a demodulating circuit for performing binary coding of laser beam intensity; and a modulation period determining circuit for determining a period F of intensity modulation of the laser beam performed by said demodulating circuit based on a period T of rotation of the glass master disk, in such a manner as to meet a following condition:

$$F=2T/(2n-1)$$

(n being a natural number).

15. A disk-type optical information recording medium comprising:

a plurality of tracks, each of said plurality of tracks comprising a land and a groove; and a dividing section which divides each land and each groove in a circumferential direction of the medium, a terminal end of the groove aligning with a leading end of the land across said dividing section in the circumferential direction of the medium.

16. An optical information recording/reproducing apparatus for executing at least one of recording of information in, and reproduction of information from, a disk-type optical information medium having a plurality of tracks, each of the plurality of tracks including a land or a groove arranged on the disk such that a terminal end of the groove aligns with a leading end of the land across a dividing section in a circumferential direction of the medium, said apparatus comprising:

an optical head for irradiating the track on the recording medium with a light beam;

a tracking error signal generating circuit for generating a tracking error signal based on an output from said optical head;

a dividing section detecting circuit for producing a dividing section detection signal upon detection of said dividing section;

a polarity change-over device for switching polarity of said tracking error signal in response to the dividing section detection signal; and a servo circuit for effecting a tracking servo control of the light beam from said optical head based on the tracking error signal of the polarity switched by said polarity change-over device.

17. An optical information recording/reproducing method for executing at least one of recording of information in, and reproduction of information from, a disk-type optical information medium having a plurality of tracks, each of the plurality of tracks including a land or a groove arranged on the disk such that a terminal end of the groove aligns with a leading end of the land across a dividing section in a circumferential direction of the medium, the method comprising the steps of:

irradiating a track on the medium with a light beam;

generating a tracking error signal based on the light of the beam reflected by the medium;

detecting the dividing section;

switching a polarity of a tracking error signal in accordance with the result of said detecting step; and performing tracking control of the light beam based on the tracking signal of the polarity switched in said switching step.

18. A master disk exposure apparatus for use in fabricating a master disk of an optical information recording medium comprising a plurality of tracks, each of said plurality of tracks comprising at least a land or a groove, and a dividing section which divides each land and each groove in a circumferential direction of the medium, a terminal end of the groove aligning with a leading end of the land across a dividing section in the circumferential direction of the medium, said apparatus comprising:

a driving mechanism for rotatingly driving a glass master disk with a photosensitive material applied thereto;

an exposure system for irradiating the glass master disk with a laser beam to expose the photosensitive material;

a traverse feed mechanism for moving at least one of said exposure system and said driving mechanism in such a manner as to cause a radial movement of a spot of the laser beam relative to the glass master disk;

a demodulating circuit for performing binary coding of laser beam intensity; and a modulation period determining circuit for determining a period F of intensity modulation of the laser beam performed by said demodulating circuit based on a period T of rotation of the glass master disk, in such a manner as to meet a following condition:

$F = 2T/(2n-1)$ (n being a natural number).

* * * * *

UNITED STATES PATENT AND TRADEMARK OFFICE
CERTIFICATE OF CORRECTION

PATENT NO. : 5,896,365

DATED : April 20, 1999

INVENTOR(S) : TOMOYUKI HIROKI

It is certified that error appears in the above-identified patent and that said Letters Patent is hereby corrected as shown below:

COLUMN 4,
Line 38, "that" should read --as--.

COLUMN 8,
Line 11, "of" should be deleted.

COLUMN 13,
Line 4, "cause" should read --causes--; and
Line 52, "as" should read --as a--.

COLUMN 14,
Line 49, "be" should be deleted.

COLUMN 17,
Line 38, "approximate" should read --approximates--.

COLUMN 20,
Line 52, "met" should read --meet--.

COLUMN 23,
Line 20, "a" (2nd occurrence) should be deleted.

UNITED STATES PATENT AND TRADEMARK OFFICE
CERTIFICATE OF CORRECTION

PATENT NO. : 5,896,365

DATED : April 20, 1999

INVENTOR(S): TOMOYUKI HIROKI

It is certified that error appears in the above-identified patent and that said Letters Patent is hereby corrected as shown below:

<u>COLUMN 24</u>,
Line 15, "to" should be deleted;
Line 16, "t," should read --$t_1$--;
Line 22, close up left margin;
Line 31, "as long" should read --as long as--; and
Line 55, "long" should read --long as--.

<u>COLUMN 26</u>,
Line 11, "a" should be deleted; and
Line 43, "as high" should read --as high as--.

<u>COLUMN 27</u>,
Line 19, close up left margin; and
Line 34, "as high" should read --as high as--.

UNITED STATES PATENT AND TRADEMARK OFFICE
CERTIFICATE OF CORRECTION

PATENT NO. : 5,896,365

DATED : April 20, 1999

INVENTOR(S) : TOMOYUKI HIROKI

It is certified that error appears in the above-identified patent and that said Letters Patent is hereby corrected as shown below:

<u>COLUMN 30</u>,
Line 3, "from" should read --from,--;
Line 25, "said" should read --a--; and
Line 27, "a" should read --said--.

Signed and Sealed this

Twenty-third Day of November, 1999

Attest:

Q. TODD DICKINSON

*Attesting Officer*   Acting Commissioner of Patents and Trademarks